US009701785B2

United States Patent
Kou et al.

(10) Patent No.: US 9,701,785 B2
(45) Date of Patent: Jul. 11, 2017

(54) POLYMERS AND USE OF THESE AS DISPERSANTS

(71) Applicant: BASF SE, Ludwigshafen (DE)

(72) Inventors: Huiguang Kou, Viernheim (DE); Clemens Auschra, Freiburg (DE); Frank Pirrung, Gruenstadt (DE); Dario Perera-Diez, Basel (CH)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/903,253

(22) PCT Filed: Jul. 21, 2014

(86) PCT No.: PCT/EP2014/065606
§ 371 (c)(1),
(2) Date: Jan. 6, 2016

(87) PCT Pub. No.: WO2015/011085
PCT Pub. Date: Jan. 29, 2015

(65) Prior Publication Data
US 2016/0145381 A1    May 26, 2016

(30) Foreign Application Priority Data

Jul. 22, 2013   (EP) .................................... 13177410

(51) Int. Cl.
| | |
|---|---|
| *C08G 63/02* | (2006.01) |
| *C08G 63/91* | (2006.01) |
| *C08G 81/00* | (2006.01) |
| *C08G 64/42* | (2006.01) |
| *C08J 7/04* | (2006.01) |
| *C08F 20/18* | (2006.01) |
| *C09D 11/037* | (2014.01) |
| *C09D 17/00* | (2006.01) |

(Continued)

(52) U.S. Cl.
CPC ............ *C08G 63/912* (2013.01); *C08F 20/18* (2013.01); *C08G 63/91* (2013.01); *C08G 64/42* (2013.01); *C08G 81/00* (2013.01); *C08J 7/047* (2013.01); *C09D 11/037* (2013.01); *C09D 17/002* (2013.01); *C09D 133/08* (2013.01); *C09D 167/04* (2013.01); *C08F 2438/02* (2013.01); *C08J 2367/00* (2013.01); *C08J 2400/10* (2013.01)

(58) Field of Classification Search
CPC .............................. C08G 63/912; C08F 20/18
USPC ......................................... 508/454; 528/288
See application file for complete search history.

(56) References Cited

U.S. PATENT DOCUMENTS

| | | |
|---|---|---|
| 4,180,644 A | 12/1979 | Marquis et al. |
| 4,191,706 A | 3/1980 | Marquis et al. |
| 4,191,835 A | 3/1980 | Habermeier et al. |

(Continued)

FOREIGN PATENT DOCUMENTS

| | | |
|---|---|---|
| EP | 0 021 569 A1 | 1/1981 |
| WO | 92/13911 A1 | 8/1992 |
| WO | 00/40630 A1 | 7/2000 |
| WO | 03/046029 A1 | 6/2003 |
| WO | 2006/074969 A1 | 7/2006 |
| WO | 2008/107326 A1 | 9/2008 |
| WO | 2009/064685 A2 | 5/2009 |
| WO | WO 2009/064685 * | 5/2009 |
| WO | 2011/120947 A1 | 10/2011 |

OTHER PUBLICATIONS

International Search Report Issued Oct. 29, 2014 in PCT/EP14/065606 Filed Jul. 21, 2014.

(Continued)

*Primary Examiner* — Terressa Boykin
(74) *Attorney, Agent, or Firm* — Oblon, McClelland, Maier & Neustadt, L.L.P.

(57) ABSTRACT

A polymer comprises at least one functional group of the formula (I) bound to one of the termini and/or to the backbone of the polymer, or a salt thereof. # indicates the point of attachment to the terminus and/or to the polymer backbone; A is a chemical bond or a divalent moiety selected from the group consisting of $C_1$-$C_6$ alkylene, —O—($C_2$-$C_6$ alkylene), —C(=O)—O—($C_2$-$C_6$ alkylene), —$NR^3$—($C_2$-$C_6$ alkylene) and C(=O)—$NR^3$—($C_2$-$C_6$ alkylene), where the $C_2$-$C_6$ alkylene part is attached to Q; Q is a divalent moiety selected from the group consisting of —O—, —NH— and —S—; and X is a divalent moiety selected from the group consisting of linear $C_1$-$C_{10}$ alkylene, linear $C_2$-$C_6$ alkenylene, $C_4$-$C_7$ cycloalkylene, arylene and alkarylene, wherein the linear $C_1$-$C_{10}$ alkylene, the linear $C_2$-$C_6$ alkenylene, the $C_4$-$C_7$ cycloalkylene, the arylene and the alkarylene may be substituted.

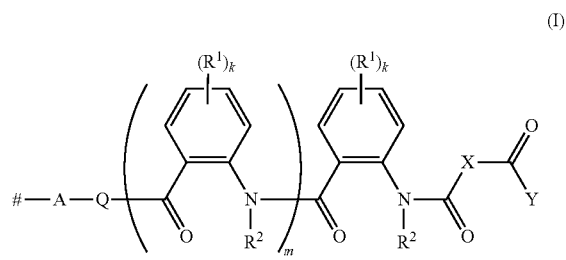

24 Claims, No Drawings

(51) Int. Cl.
    *C09D 133/08*    (2006.01)
    *C09D 167/04*    (2006.01)

(56) References Cited

U.S. PATENT DOCUMENTS

| | | |
|---|---|---|
| 4,247,677 A | 1/1981 | Schmidt et al. |
| 4,260,729 A | 4/1981 | Schmidt et al. |
| 5,231,149 A | 7/1993 | Longley et al. |
| 2003/0212291 A1 | 11/2003 | Gajewski et al. |
| 2010/0298185 A1 | 11/2010 | Gieselman et al. |
| 2015/0038640 A1 | 2/2015 | Kou et al. |

OTHER PUBLICATIONS

U.S. Appl. No. 14/896,581, filed Dec. 7, 2015, Huiguang Kou et al.

* cited by examiner

POLYMERS AND USE OF THESE AS DISPERSANTS

The present invention relates to novel polymers, to a process for their manufacturing, to the use of said polymers as dispersants and to liquid compositions containing solid fine particles, such as organic or inorganic pigments and fillers, and the novel polymers as dispersants.

Dispersions containing solid dispersible particles, such as organic or inorganic pigments and fillers, and polymer additives, namely dispersants, are used in an almost unlimited number of different technical applications, e.g. as coating materials, for printing inks, colouring plastic materials, including fibres, glasses, or ceramic products, for formulations in cosmetics, or for the preparation of paint systems, in particular automotive, industrial and decorative paints.

The function of polymeric dispersant in such dispersions is manifold. Mainly, they act as stabilizers for the solid fine particulate materials, i.e. the dispersant separates the particles of the solid fine particulate material and thus prevent them from coagulation or clumping and settling from the liquid phase. They also may act as solubilisers in the given carrier liquid, e.g. water or organic solvents. Polymer additives may also improve the gloss of the dispersion or enhance its rheology. Depending on the type and polarity of the dispersing agent, e.g. water, organic solvents or mixtures thereof, polymers of variable structure are chosen. In view of ecological requirements, the use of aqueous pigment dispersions is particularly preferred, as well as dispersions based on organic solvents with high solids content.

In view of the almost unlimited range of different technical applications, there remains a growing need for dispersants of improved pigment affinity and rheology behaviour, as expressed by the viscosity of the mill base at a given shear rate and improved gloss of surface coatings.

WO 92/13911A1 relates to acetoacetanilide functionalized poly(alkylene glycol)s, which are prepared by reacting a poly(alkylene glycol) monoamine, diamine or triamine with isatoic anhydride followed by acetoacetylation of the resultant aminobenzamide. WO 92/13911A1 suggests using said acetoacetanilide functionalized poly(alkylene glycol)s for preparing improved diarylide pigment compositions, which in turn are useful for preparing storage stable printing inks, especially of the publication gravure type inks.

WO 00/40630 discloses pigment dispersions containing block copolymers as dispersants prepared by the ATRP method (atom transfer radical polymerisation) of ethylenically unsaturated monomers. The block copolymers consist of defined hydrophobic and hydrophilic polymer blocks. WO 03/046029 discloses block copolymers as dispersants, which are similar to those of WO 00/40630 but which are subsequently neutralized with specific salt forming compounds.

WO2008107326 and the literature cited therein relates to poly(alkylene imine) grafted polymers of the acrylate, polyether or polyester type, which are useful as pigment dispersants.

Polymers having pending anthranilate or anthranilamide groups, which may be attached directly or via a bivalent spacer to the polymer back-bone or to the termini of the polymers have been described several times as crosslinkers or chain extenders for polyurethanes or epoxys, e.g. from the following patent documents:

Anthranilate functionalized poly(alkylene oxide)s are e.g. known from U.S. Pat. No. 4,180,644, U.S. Pat. No. 4,191,706, U.S. Pat. No. 4,191,835, U.S. Pat. No. 4,247,677, U.S. Pat. No. 4,260,729 and US2003212291. Anthranilate functionalized poly(alkylene oxide)s are used as a crosslinker agent for polyurethane or epoxy coatings.

Anthranilate functionalized polyesters are e.g. known from EP 21569. They are used as a chain extender in the production of polyureas and polyureapolyurethanes.

Anthranilate functionalized polycarbonates are e.g. known from U.S. Pat. No. 5,231,149. They are used for the production of graft or block copolymers having improved impact and solvent resistance.

It has now surprisingly found that polymers having at least one anthranilate or anthranilamide group carrying a group —(C=O)—X—COY at the anthranilamide nitrogen, to be specific a functional group of the formula I as defined hereinafter, and which is bound to one of the termini and/or to the backbone of the polymer, as well as their salts, have beneficial properties in that they have superior pigment affinity, show improved rheology behaviour and improved gloss of surface coatings.

Therefore, the present invention relates to a polymer P having at least one functional moiety of the formula I, which is bound to one of the termini or to the backbone of the polymer P:

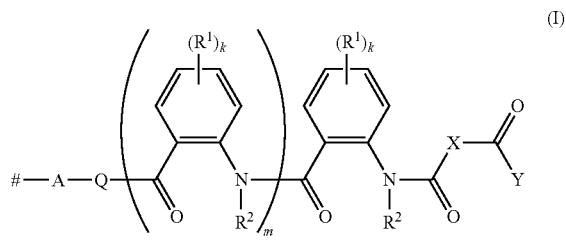

bound to one of the termini and/or to the backbone of the polymer, where
# indicates the point of attachment to the terminus and/or to the polymer backbone;
k is 0, 1, 2, 3 or 4;
m is 0, 1, 2, 3, 4, 5, 6, 7, 8 or 9;
A is a chemical bond or a divalent moiety selected from the group consisting of $C_1$-$C_6$ alkylene, —O—($C_2$-$C_6$ alkylene), —C(=O)—O—($C_2$-$C_6$ alkylene), —$NR^3$—($C_2$-$C_6$ alkylene) and C(=O)—$NR^3$—($C_2$-$C_6$ alkylene), where the $C_2$-$C_6$ alkylene part is attached to Q;
Q is a divalent moiety selected from the group consisting of —O—, —NH— and —S—;
$R^1$ is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_{20}$ alkyl, $C_1$-$C_4$ alkoxy, halogen, aryloxy, aryl, heteroaryl, where aryl, hetaryl and aryloxy are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;
$R^2$ is selected from the group consisting of hydrogen, —S(=O)$_2$R$^4$, $C_1$-$C_{20}$ alkyl, $C_3$-$C_{10}$ cycloalkyl, aryl, heteroaryl, aryl-$C_1$-$C_4$-alkyl and heteroaryl-$C_1$-$C_4$-alkyl, where aryl and hetaryl in the four last mentioned radicals are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;

X is a divalent moiety selected from the group consisting of linear $C_1$-$C_{10}$ alkylene, linear $C_2$-$C_6$ alkenylene, $C_4$-$C_7$ cycloalkylene, arylene and alkarylene, where the linear $C_1$-$C_{10}$ alkylene, linear $C_2$-$C_6$ alkenylene and $C_4$-$C_7$ cycloalkylene are unsubstituted or substituted by 1, 2, 3 or 4 radicals selected from the group consisting of $C_1$-$C_{18}$ alkyl or $C_1$-$C_{18}$ alkenyl, and where arylene and alkarylene are unsubstituted or substituted by 1, 2, 3 or 4 radicals selected from the group consisting of $C_1$-$C_4$ alkyl, $C_1$-$C_4$ haloalkyl, aryl, —COOH, —COOCH$_3$, —NO$_2$ or halogen;

$R^3$ is selected from the group consisting of hydrogen, —S(=O)$_2$R$^4$, $C_1$-$C_{20}$ alkyl, $C_3$-$C_{10}$ cycloalkyl, aryl and heteroaryl, where aryl and hetaryl are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;

$R^4$ is selected from the group consisting of OH, —NH$_2$, —NH($C_1$-$C_6$ alkyl), —N($C_1$-$C_6$ alkyl)$_2$, $C_1$-$C_4$ alkyl, $C_1$-$C_4$ alkoxy, aryl and heteroaryl, where aryl and hetaryl are unsubstituted or substituted by 1, 2, 3 or 4 radicals selected from the group consisting of $C_1$-$C_4$ alkyl, $C_1$-$C_4$ alkoxy and halogen;

Y is selected from —OH or a moiety of the general formula I.2

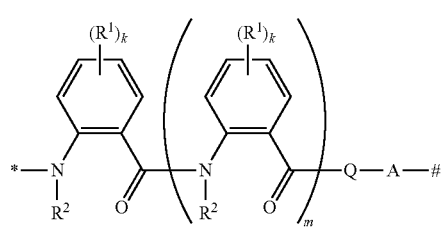

(I.2)

where * indicates the point of attachment to the carbonyl group and #, k, m, A, Q,
R$^1$ and R$^2$ are as defined above;
and to the salts of polymer P.

The present invention further relates to a process for the manufacturing of the novel polymer P, which comprises
a) providing a polymer P.1 carrying at least one radical of the formula I.1:

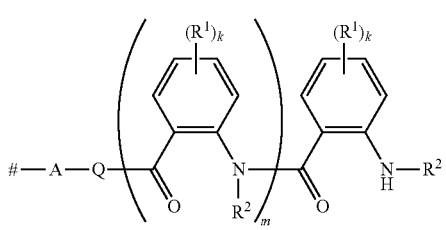

(I.1)

bound to one of the termini and/or backbone of the polymer,
where # indicates the point of attachment to the terminus and/or to the polymer backbone and
where A, Q, k, m, R$^1$ and R$^2$ are as defined above,
b) further reacting the polymer P.1 obtained in step a) with an acid anhydride of formula (IV)

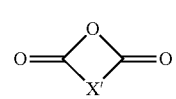

(IV)

where X' has one of the aforementioned meanings given for X and if X' carries 2, 3 or 4 COOH groups, two COOH groups may form an anhydride group.

If the acid anhydride (IV) is a dianhydride, e.g. pyromellitic dianhydride, the anhydride (IV) may react twice with the polymer P.1.

Therefore, the present invention further relates to compositions of polymers P or of their salts as defined above, which contain both at least one polymer P having one or more functional groups of formula (I), wherein Y is —OH, and at least one polymer P having one or more functional groups of formula (I), wherein Y is a moiety of the general formula (I.2).

The polymers P of the present invention as well as their salts act as a dispersant for fine particulate solid materials in liquid dispersions of said solid fine particulate material, i.e. they stabilize the solid particles of the solid fine particulate material in a liquid composition of the solid fine particulate material. Stabilization means that the dispersant separates the solid particles and prevents them from coagulation or clumping and settling from the liquid composition. These benefits can be achieved by the polymers P and by their salts even at high solids content, e.g. at concentrations of the solid particulate material of 30% by weight or more, based on the total weight of the liquid compositions. Moreover, the polymers P and their salts also enhance its rheology, which is normally difficult to achieve at high solids content. The polymers P of the present invention as well as their salts also improve the gloss of a coating, which is obtained when the liquid composition containing the polymer P or a salt thereof and a solid particulate material is coated to a substrate.

Therefore, the polymers P of the present invention and their salts are especially useful as dispersant in liquid coating compositions containing solid fine particles, such as organic or inorganic pigments and fillers, in particular coating compositions, which, besides the polymer P or a salt thereof, contain a conventional polymer binder.

Without being bound to theory, it is believed that the beneficial effects are based on the following mechanisms: The modified anthranilate/anthranilamide moieties have affinity to the surface of the solid particles thereby provide a strong physical binding of the dispersant to the solid particles. The polymer part, on the other hand, can interact with the resin phase to build up a steric environment to stabilize pigment dispersion.

The present invention thus also relates to liquid compositions in the form of a dispersion, which comprise a fine particulate solid material, selected from the group consisting of pigments and fillers, a liquid diluent, wherein the fine particulate solid material is dispersed in the liquid diluent, further comprising a polymer P and/or the salts thereof as defined herein and in the claims.

The present invention also relates to liquid coating compositions, which comprise a fine particulate solid material, selected from the group consisting of pigments and fillers, a liquid diluent, wherein the fine particulate solid material is dispersed in the liquid diluent, further comprising a polymer P and/or the salts thereof as defined herein and in the claims and optionally a polymer binder.

The present invention further relates to the use of the novel polymers P and the salts thereof as dispersants for fine particulate solid material, selected from the group consisting of pigments and fillers.

Here and in the following, generic terms such as alkyl, cycloalkyl, aryl, alkylene, alkenylene, cycloalkylene, arylene, alkarylene or halogen for the variables defining the formula I are used. These variables have to be understood as a list of individual radicals which are representatives of the generic term.

In this context, the term $C_n$-$C_m$ indicates the possible number of carbon atoms, which the individual members of the generic terms may have.

In this context, the term "halogen" has to be understood as a halogen radical, which is generally selected from fluorine, chlorine, bromine or iodine, in particular from fluorine or chlorine.

The term "alkyl" as used herein and the alkyl parts of —NH($C_1$-$C_6$ alkyl) and —N($C_1$-$C_6$ alkyl)$_2$ in each case denote a saturated hydrocarbon radical which may be linear or branched and which generally has from 1 to 6 carbon atoms ($C_1$-$C_6$ alkyl) and which preferably has from 1 to 4 carbon atoms ($C_1$-$C_4$ alkyl). Examples of $C_1$-$C_4$-alkyl are methyl, ethyl, n-propyl, iso-propyl, n-butyl, 2-butyl (sec-butyl), isobutyl and tert-butyl. Examples for $C_1$-$C_6$-alkyl are, apart those mentioned for $C_1$-$C_4$-alkyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl. Examples for $C_1$-$C_{20}$-alkyl are, apart those mentioned for $C_1$-$C_6$-alkyl, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, n-octyl, 1-methyloctyl, 2-methylheptyl, 1-ethylhexyl, 2-ethylhexyl, 1,2-dimethylhexyl, 1-propylpentyl, 2-propylpentyl, nonyl, decyl, 2-propylheptyl, 3-propylheptyl, linear undecyl and its branched isomers, lauryl and its branched isomers, linear tridecyl and its branched isomers, myristyl and its branched isomers, palmityl and its branched isomers, stearyl and its branched isomers, and eicosenyl and its branched isomers.

The term "alkylene" (or alkanediyl) as used herein and in —O—($C_2$-$C_6$ alkylene), —C(=O)—O—($C_2$-$C_6$ alkylene), —NR$^3$—($C_2$-$C_6$ alkylene) and C(=O)—NR$^3$—($C_2$-$C_6$ alkylene), in each case denotes an alkyl radical as defined above, wherein one hydrogen atom at any position of the carbon backbone is replaced by one further binding site, thus forming a bivalent moiety. Preferred alkylene has 2 to 6 carbon atoms, in particular 2 to 4 carbon atoms. Preferably, the two binding sites of the bivalent moiety $C_2$-$C_6$ alkylene or $C_2$-$C_4$ alkylene, respectively, are not at the same carbon atom. Examples of alkylene include methylene, 1,2-ethandiyl (=CH$_2$CH$_2$), 1,2-propandiyl (=CH(CH$_3$)CH$_2$), 1,3-propandiyl (=CH$_2$CH$_2$CH$_2$), 1-methyl-1,3-propandiyl (=CH(CH$_3$)CH$_2$CH$_2$), 2-methyl-1,3-propandiyl (=CH$_2$CH(CH$_3$)CH$_2$), 1-methyl-1,2-propandiyl (=C(CH$_3$)$_2$CH$_2$), 1,4-butandiyl (=CH$_2$CH$_2$CH$_2$CH$_2$), 2,2-dimethyl-1,3-propandiyl (=CH$_2$C(CH$_3$)$_2$CH$_2$), etc.

The term "linear alkylene" (or linear alkanediyl) as used herein denotes in each case a linear alkyl radical, wherein one hydrogen at the end of the linear carbon backbone is replaced by a further binding site. Preferred linear alkylene has 1 to 10 carbon atoms, in particular 2 to 6 carbon atoms.

Examples of linear alkylene include methanediyl (=CH$_2$), 1,2-ethandiyl(=CH$_2$CH$_2$), 1,3-propandiyl (=CH$_2$CH$_2$CH$_2$), 1,4-butandiyl (=CH$_2$CH$_2$CH$_2$CH$_2$), etc.

The term "linear alkenylene" (or linear alkenediyl) as used herein denotes in each case a linear alkene radical, wherein one hydrogen atom at the end of the carbon backbone is replaced by a further binding site, thus forming a bivalent moiety. Preferred alkenylene has 2 to 6 carbon atoms, in particular 2 to 4 carbon atoms. Preferably, the alkenylene moieties have one or two double bonds, in particular one double bond. Examples are 1,2-ethendiyl, 1,3-propendiyl, 1,4-butendiyl, etc.

The term "cycloalkyl" as used herein (and in the cycloalkyl moieties of other groups comprising a cycloalkyl group, e.g. cycloalkoxy and cycloalkylalkyl) denotes in each case a mono- or bicyclic cycloaliphatic radical having usually from 3 to 10 carbon atoms ("$C_3$-$C_{10}$-cycloalkyl"), preferably 3 to 8 carbon atoms ("$C_3$-$C_8$-cycloalkyl") or in particular 3 to 6 carbon atoms ("$C_3$-$C_6$-cycloalkyl"). Examples of monocyclic radicals having 3 to 6 carbon atoms comprise cyclopropyl, cyclobutyl, cyclopentyl and cyclohexyl. Examples of monocyclic radicals having 3 to 8 carbon atoms comprise cyclopropyl, cyclobutyl, cyclopentyl, cyclohexyl, cycloheptyl and cyclooctyl. Examples of bicyclic radicals having 7 or 8 carbon atoms comprise bicyclo[2.1.1]hexyl, bicyclo[2.2.1]heptyl, bicyclo[3.1.1]heptyl, bicyclo[2.2.1]heptyl, bicyclo[2.2.2]octyl and bicyclo[3.2.1]octyl.

The term "cycloalkylene" (or cycloalkanediyl) as used herein denotes in each case a cycloalkyl radical as defined above, wherein one hydrogen at any position of the carbon backbone is replaced by a further binding site, thus forming a bivalent moiety. Preferred cycloalkylene has 4 to 7 carbon atoms, in particular 5 to 6 carbon atoms. Preferably, the two binding sites of the bivalent moiety $C_4$-$C_7$ cycloalkylene or $C_5$-$C_6$ cycloalkylene, respectively, are not at the same carbon atom. Examples of cycloalkylene include 1,2-cyclobutanediyl, 1,2-cyclopentanediyl, 1,2-cyclohexanediyl, etc.

The term "alkoxy" as used herein denotes in each case a straight-chain or branched alkyl group usually having from 1 to 4 carbon atoms ("$C_1$-$C_4$-alkoxy"), which is bound to the remainder of the molecule via an oxygen atom. $C_1$-$C_2$-Alkoxy is methoxy or ethoxy. $C_1$-$C_4$-Alkoxy is additionally, for example, n-propoxy, 1-methylethoxy (isopropoxy), butoxy, 1-methylpropoxy (sec-butoxy), 2-methylpropoxy (isobutoxy) or 1,1-dimethylethoxy (tert-butoxy).

The term "haloalkyl" as used herein denotes in each case an alkyl radical as defined above having 1 to 4 carbon atoms ("$C_1$-$C_4$-haloalkyl"), in particular 1 to 2 carbon atoms, wherein at least one of the hydrogen atoms of the alkyl group has been replaced by same or different halogen atoms, preferably by chloro or fluoro, in particular by fluoro. Examples of $C_1$-$C_4$-haloalkyl include but are not limited to monofluoro-, difluoro- or trifluoro-methyl, -ethyl or -propyl, for example 3,3,3-trifluoropropyl, 2-fluoroethyl, 2,2,2-trifluoroethyl, fluoromethyl, or trifluoromethyl.

The term "aryl" as used herein (and the aryl moiety in aryl-$C_1$-$C_4$-alkyl and aryloxy) in each case denotes a mono-, bi- or tricyclic hydrocarbon radical comprising at least one phenyl ring, to which one or two further saturated or unsaturated 5- or 6-membered hydrocarbon rings may be fused. Examples of aryl include phenyl, naphthyl, indanyl, indenyl, 1,2,3,4-tetrahydro-5-naphtyl, 1,2,3,4-tetrahydro-6-naphtyl, anthracenyl, 9,10-dihydroanthracen-1-yl and 9,10-dihydroanthracen-2-yl.

The term "arylene" (or arenediyl) as used herein denotes in each case an aryl radical as defined above, wherein one hydrogen at any position of the carbon backbone is replaced by a further binding site, thus forming a bivalent moiety. Preferred are 1,2-arylene radicals, where the two binding sites of arylene are located at neighboring carbon atoms. Examples of arylene include 1,2-phenylene, 1,2-naphtylene, etc.

The term "alkarylene" as used herein denotes in each case an alkyl substituted aryl radical, wherein one hydrogen at any position of the alkyl carbon backbone is replaced by a further binding site. Preferred alkarylene has 7 to 12 carbon atoms, in particular 7 to 8 carbon atoms. Examples of alkarylene include methylphenylene, ethylphenylene, 1,2-xylylene, etc.

The term "heteroaryl" as used herein (and the heteroaryl moiety in heteroaryl-$C_1$-$C_4$-alkyl) in each case denotes a mono-, bi- or tricyclic heterocyclic radical comprising at least one aromatic 5- or 6-membered heterocyclic radical having 1, 2, 3 or heteroatoms selected from N, O and S as ring members, to which one or two further saturated or unsaturated 5- or 6-membered hydrocarbon rings or heterocyclic rings having 1, 2, 3 or heteroatoms selected from N, O and S as ring members may be fused. Examples of 5- or 6-membered heterocyclic radicals (monocyclic heteroaryl), include furyl, thienyl, pyrrolyl, imidazolyl, pyrazolyl, triazolyl, oxazolyl, thiazolyl, isoxazolyl, isothiazolyl, pyridyl, pyrimidinyl, pyrazinyl, pyridazinyl and triazinyl. Examples of 5- or 6-membered heterocyclic radicals to which one or two further saturated or unsaturated 5- or 6-membered hydrocarbon rings or heterocyclic rings having 1, 2, 3 or heteroatoms selected from N, O and S as ring members are fused (bi and tricyclic heteroaryl), include, quinolinyl, quinazolinyl, quinoxalinyl, benzofuryl, benzothienyl, indolyl, indazolyl, benzimidazoly, benzoxazolyl, benzoisoxazolyl, benzoisothiazolyl etc.

The term "aryl-$C_1$-$C_4$-alkyl" denotes an aryl radical as defined herein, which is bound to the remainder via a $C_1$-$C_4$-alkylene moiety as defined herein.

The term "aryloxy" denotes an aryl radical as defined herein, which is bound to the remainder via an oxygen atom.

The term "heteroaryl-$C_1$-$C_4$-alkyl" denotes a heteroaryl radical as defined herein, which is bound to the remainder via a $C_1$-$C_4$-alkylene moiety as defined herein.

Suitable salts of the polymer P include alkylammonium salts such as monoalkylammonium salts, for example ethylammonium, dialkylammonium salts, for example diisopropylammonium, trialkylammonium salts, for example triethylammonium, diisopropylethylammonium or tributylammonium, as well as alkanolammonium salts such as monoalkanolammonium salts, for example ethanolammonium or 2-ammonium-2-methyl-1-propanol, N,N-dialkylalkanolammonium salts, for example N, Ndimethylethanolammonium or N,N-dimethylammoniumethylpropanol, dialkanolammonium salts, for example diethanolammonium and trialkanolammonium salts, for example triethanolammonium. Suitable salts of the polymer P include alkali metal or alkaline earth metal salts, for example sodium, potassium, lithium or calcium salts, and ammonium salts.

The remarks made below as to preferred embodiments of the variables (substituents) of the moieties of formula (I) are valid on their own as well as preferably in combination with each other. It is clear to a skilled person that for k being 2, 3 or 4, the substituent radical $R^1$ may be identical or different. It is also clear to a skilled person that for m>0 the meanings k, $R^1$ and $R^2$ in each repeating unit may be identical or different, generally, they will be identical.

The remarks made below concerning preferred embodiments of the polymers P and P' are valid on their own as well as preferably in combination with each other concerning the polymers P and P' as well as concerning the uses, compositions and methods according to the invention.

In particular the variables k, m, A, Q, $R^1$, $R^2$, X, $R^3$ and $R^4$ alone or in combination have preferably the following meanings k is 0, 1 or 2, in particular 0 or 1;
m is 0, 1 or 2, in particular 0 or 1;
A is a chemical bond or a divalent moiety selected from the group consisting of —C(=O)—O—($C_2$-$C_4$ alkylene) and C(=O)—NH—($C_2$-$C_4$ alkylene), where the alkylene part is attached to Q, especially a chemical bond or a divalent moiety —C(=O)—O—($C_2$-$C_4$ alkylene), where the alkylene part is attached to Q;
Q is a divalent moiety selected from the group consisting of —O— and —$NR^3$—, in particular —O— or —NH—;
$R^1$ if present, is independently selected from the group consisting of —OH, —COOH, —$COOCH_3$, —$NH_2$, —NH($C_1$-$C_6$ alkyl), —N($C_1$-$C_6$ alkyl)$_2$, —$NO_2$, —S(=O)$_2R^4$, $C_1$-$C_4$ alkyl, $C_1$-$C_4$ alkoxy, halogen, phenyl and pyridyl, where the last two radicals are unsubstituted or carry a radical selected from halogen, $C_1$-$C_4$ alkyl and $C_1$-$C_4$ alkoxy;
$R^2$ is selected from the group consisting of hydrogen, $C_1$-$C_4$ alkyl and phenyl, in particular $R^2$ is hydrogen;
X is selected from the group consisting of linear $C_2$-$C_6$ alkylene, $C_2$-alkenylene and 1,2-phenylene, where $C_2$-$C_6$ alkylene and $C_2$ alkenylene are unsubstituted or carry a $C_1$-$C_{18}$ alkyl or $C_1$-$C_{18}$ alkenyl radical and 1,2-phenylene is unsubstituted or substituted by 1 or 2 radicals selected from the group consisting of $C_1$-$C_3$ alkyl, —COOH or halogen, in particular X is $C_2$-$C_4$ alkylene;
$R^3$ if present, is selected from the group consisting of hydrogen and $C_1$-$C_4$ alkyl;
$R^4$ if present, is selected from the group consisting of —$NH_2$, —NH($C_1$-$C_6$ alkyl), —N($C_1$-$C_6$ alkyl)$_2$ and $C_1$-$C_4$ alkyl;
Y is selected from —OH and a moiety of the general formula I.2

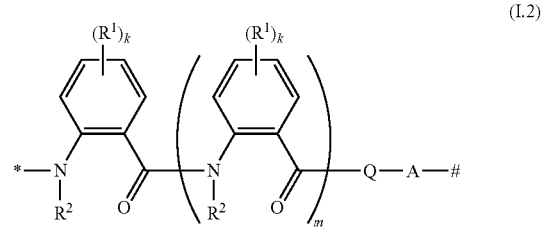

(I.2)

where * indicates the point of attachment to the carbonyl group and #, k, m, A, Q, $R^1$ and $R^2$ have the aforementioned meanings, in particular Y is —OH.

In an even more preferred embodiment, the variables k and m are both 0, A and Q are as defined above, $R^2$ is hydrogen and X is $C_2$-$C_4$ alkylene.

In particular Y is —OH.

In an especially preferred embodiment, the variables k and m are both 0, A and Q are as defined above, $R^2$ is hydrogen, X is $C_2$-$C_4$ alkylene and Y is OH.

If not stated otherwise, the polymers P of the present invention have at least one radical of the formula I, in particular from 1 to 200 or 2 to 200 or 3 to 200, especially 1 to 100 or 2 to 100 or 3 to 100, radicals of the formula I. These radicals of the formula I may be bound either to one or more of the termini of the polymer backbone or at any other position of the polymer backbone. In a particular embodiment, the polymers P have 1, 2 or 3 radicals of the formula I.

Preferably, the polymer P is selected from the group consisting of polyesters, in particular aliphatic polyesters, polyethers, in particular poly-$C_2$-$C_4$-alkylene oxides, polycarbonates, in particular aliphatic polycarbonates, polyetheresters, in particular aliphatic polyetheresters having at least one aliphatic polyester block and at least one aliphatic polyether block such as a poly-$C_2$-$C_6$-alkylene oxide moiety, and polymers having a C—C-backbone, in particular those which comprise repeating units of polymerized monoethylenically unsaturated monomers M1 as defined hereinafter, in particular those, where the repeating units M1 are selected from polymerized $C_1$-$C_{10}$-alkyl (meth)acrylates, polymerized $C_1$-$C_{10}$-alkyl-(poly-$C_2$-$C_4$-alkyleneglycol) (meth)acrylates, and polymerized vinylaromatic hydrocarbon compounds, such as styrene, especially those, where the amount of repeating units M1 make up from 10 to 90% by weight, based on the total weight of the polymer P, especially from 30 to 80% by weight, based on the total weight of the polymer P.

The term "$C_1$-$C_{10}$-alkyl (meth)acrylates" as used herein refers to both the $C_1$-$C_{10}$-alkylesters of acrylic acid and to the $C_1$-$C_{10}$-alkylesters of methacrylic acid.

The term "$C_1$-$C_{10}$-alkyl-(poly-$C_2$-$C_4$-alkyleneglycol) (meth)acrylates" as used herein refers to both the esters of mono-$C_1$-$C_{10}$-alkyl-terminated poly-$C_2$-$C_4$-alkyleneglycols, in particular mono-$C_1$-$C_{10}$-alkyl-terminated polyethyleneglycols, with acrylic acid and the corresponding esters with methacrylic acid.

The aforementioned polyesters, polyethers, polyetheresters, polycarbonates and polymers having a C—C-backbone are modified in that they carry at least one functional moiety of the formula I, in particular from 1 to 200 or 2 to 200 or 3 to 200, especially 1 to 100 or 2 to 100 or 3 to 100, functional moieties of the formula I, where the functional moieties of the formula I may be bound either to one or more of the termini of the polymer backbone or at any other position of the polymer backbone.

The term "aliphatic polyether" is understood as a polyether, where the majority of the carbon atoms in the repeating units, in particular at least 90% of the carbon atoms of the repeating units in the polymer backbone are present as alkylene units, in particular $C_2$-$C_4$ alkylene units, which are linked by oxygen atoms, where the alkylene units may carry a hydroxyl group. In particular the polymer backbone of aliphatic polyethers does not contain aromatic rings such as phenyl.

The term "aliphatic polyesters" is understood as a polyester, where the majority of the carbon atoms in the repeating units, in particular at least 90% of the carbon atoms of the repeating units in the polymer backbone are present as alkylene units and carbonyl groups, in particular $C_2$-$C_6$ alkylene units and carbonyl groups, where the alkylene units may carry a hydroxyl group. In particular the polymer backbone of aliphatic polyesters does not contain aromatic rings such as phenyl.

The term "aliphatic polyetheresters" is understood as a block polyether-co-polyester having both at least one, e.g. 1, 2, 3 or 4 polyether block(s) and at least one, e.g. 1, 2, 3 or 4 polyester block(s). The weight ratio of the polyester blocks and the polyether blocks is usually in the range from 1 to 100 to 100:1 in particular in the range from 1:10 to 10:1. The majority of the carbon atoms in the polyester blocks, in particular at least 90% of the carbon atoms of the repeating units in the polyester blocks are present as alkylene units and carbonyl groups, in particular $C_2$-$C_6$ alkylene units and carbonyl groups, while the carbon atoms in the polyether blocks are present as alkylene units, in particular $C_2$-$C_6$ alkylene units or $C_2$-$C_3$ alkylene units. The alkylene units in both the aliphatic polyester blocks and the polyester blocs of the aliphatic polyetheresters may carry a hydroxyl group. In particular the polymer backbone of aliphatic polyetheresters does not contain aromatic rings such as phenyl. A particular embodiment of aliphatic polyetheresters have exactly one polyether block and exactly one polyester block.

The term "aliphatic polycarbonates" is understood as a polycarbonate, where the majority of the carbon atoms in the repeating units, in particular at least 90% of the carbon atoms of the repeating units in the polymer backbone are present as alkylene units and carbonyl groups, in particular $C_2$-$C_6$ alkylene units and carbonyl groups, where the alkylene units may carry a hydroxyl group. In particular the polymer backbone of aliphatic polyesters does not contain aromatic rings such as phenyl.

With regard to their capability of acting as a dispersant, in particular as a dispersant for pigments and fillers, preference is given to polymers P, which have a number average molecular weight $M_N$ in the range from 500 to 100.000 Dalton, in particular from 1000 to 80.000 Dalton, especially from 1500 to 50.000 Dalton. The weight average molecular weight $M_W$ of the polymers P is generally in the range from 600 to 500.000 Dalton, in particular from 1000 to 300.000 Dalton, especially from 1500 to 150.000 Dalton. The polydispersity $M_W/M_N$ is generally in the range from 1.05 to 5, preferably from 1.1 to 4 and especially from 1.2 to 3.

With regard to their capability of acting as a dispersant, in particular as a dispersant for pigments and fillers, preference is given to polymers P, which are characterized by an acid number in the range from 3 to 500 mg KOH per gramm of polymer P, in particular from 10 to 300 mg KOH per gramm of polymer P.

With regard to their capability of acting as a dispersant, in particular as a dispersant for pigments and fillers, preference is given to polymers P, which in addition to the functional moieties of the formula I have one ore more poly-($C_2$-$C_4$-alkyleneoxide) radicals which may be located in the polymer backbone ore grafted onto the polymer backbone. In these poly-($C_2$-$C_4$-alkyleneoxide) radicals, the $C_2$-$C_4$-alkyleneoxide repeating units preferably comprise at least 50% by weight ethyleneoxide repeating units. In particular, the poly-($C_2$-$C_4$-alkyleneoxide) radicals are polyethyleneoxide radicals. The number average weight of the poly-($C_2$-$C_4$-alkyleneoxide) radicals will generally be in the range from 150 to 5000 Dalton. The poly-($C_2$-$C_4$-alkyleneoxide) radicals may carry a terminal OH group or may be "endcapped", i.e. the hydrogen atom of the terminal OH group is replaced by a hydrocarbon radical such as $C_1$-$C_{10}$-alkyl, benzyl or $C_5$-$C_{10}$-cycloalkyl.

In a particular embodiment of the invention the polymer P is an aliphatic polyether, in particular a poly-($C_2$-$C_4$-alkylene oxide), especially a poly(ethylene oxide), a poly(propylene oxide) or a poly(ethylene oxide-co-propylene oxide), where in the latter the ethylene oxide and propylene oxide repeating units may be arranged randomly or blockwise. The poly-($C_2$-$C_4$-alkylene oxide) carries at least one moiety of the formula I, e.g. from 1 to 200 or from 1 to 100 moieties of the formula I, and in particular it carries 1, 2, 3, or 4 moieties of the formula I. In the moieties of the formula I, which are attached to the termini or the polymer backbone of the poly-($C_2$-$C_4$-alkylene oxide), the variable A is preferably a single bond. Q is preferably O or NH. The aliphatic polyethers may be linear or branched or hyperbranched.

In another particular embodiment of the invention the polymer P is an aliphatic polyester, in particular a linear or branched or hyperbranched aliphatic polyester, selected from
a) aliphatic polyesters, where the majority, in particular at least 70% of repeating units are units of the polyester backbone are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups; and
b) aliphatic polyesters, where the majority, in particular at least 70% of repeating units are units of the polyester backbone are derived from one or more, e.g. 1, 2 or 3 aliphatic $C_4$-$C_{10}$ lactones, or a combination of one or more, e.g. 1, 2 or 3 aliphatic $C_4$-$C_{10}$ lactones with at least one further component, selected from $C_2$-$C_{10}$ dicarboxylic acids, $C_2$-$C_{10}$ aliphatic diols, and $C_3$-$C_{10}$ aliphatic or $C_5$-$C_{10}$-cycloaliphatic polyols having 3, 4, 5 or 6 hydroxyl groups.

In a further particular embodiment of the invention the polymer P is an aliphatic polyetherester, in particular a linear or branched or hyperbranched aliphatic polyetherester, selected from
a) aliphatic polyetheresters, where the majority, in particular at least 70% of repeating units are units of the polyester blocks are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise; and
b) aliphatic polyetheresters, where the majority, in particular at least 70% of repeating units are units of the polyester blocks are derived from one or more, e.g. 1, 2, or 3 aliphatic $C_4$-$C_{10}$ lactones, or a combination thereof with one or more, e.g. 1, 2 or 3 further components, selected from $C_2$-$C_{10}$ dicarboxylic acids, $C_2$-$C_{10}$ aliphatic diols, and $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise.

The weight ratio of the polyester blocks and the polyether blocks is usually in the range from 1 to 100 to 100:1 in particular in the range from 1:10 to 10:1.

With regard to polyesters and polyetheresters, examples of aliphatic $C_2$-$C_{10}$ dicarboxylic acids include malonic acid, succinic acid, glutaric acid, 2-methylglutaric acid, 3-methylglutaric acid, adipic acid, pimelic acid, azelaic acid, sebacic acid, 2,2-dimethylglutaric acid, suberic acid and diglycolic acid.

Examples of $C_2$-$C_{10}$ aliphatic diols include ethylene glycol, 1,2-propanediol, 1,3-propanediol, 1,2-butanediol, 1,4-butanediol, 1,5-pentanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, diethylene glycol and triethylene glycol.

Examples of $C_3$-$C_{10}$ aliphatic or $C_5$-$C_{10}$-cycloaliphatic polyols having 3, 4, 5 or 6 hydroxyl groups include glycerol, trimethylolpropane, trimethylolethane, pentaerythritol, sorbitol, innositol, pentahydroxycyclopentane, hexahydroxycyclohexane, etc.

Examples of $C_4$-$C_{10}$ lactones include, γ-butyrolactone, γ-valerolactone, δ-valerolactone, ε-caprolactone.

A particular preferred embodiment of the invention relates to polymer P, where the polymer backbone is an aliphatic polyesters, where the majority, in particular at least 70% of repeating units are units of the polyester backbone are derived from aliphatic $C_4$-$C_{10}$ lactones, in particular from γ-valerolactone, δ-valerolactone, ε-caprolactone or a mixture thereof.

The aliphatic polyesters carry at least one moiety of the formula I, e.g. from 1 to 200 or from 1 to 100 moieties of the formula I, and in particular it carries from 1 to 50 moieties of the formula I. In the moieties of the formula I, which are attached to the polymer backbone of the aliphatic polyester, the variable A is preferably a single bond. Q is preferably O or NH.

A particular preferred embodiment of the invention relates to polymer P which is an aliphatic polyetherester, where in the at least one polyester block the majority, in particular at least 70% of repeating units are units of the polyester block are derived from aliphatic $C_4$-$C_{10}$ lactones, in particular from γ-valerolactone, δ-valerolactone, ε-caprolactone or a mixture thereof and where the at least one aliphatic polyether block is as defined above, and where the polyether blocks are preferably poly-($C_2$-$C_4$-alkylene oxides), especially poly(ethylene oxides), poly(propylene oxides) or poly (ethylene oxide-co-propylene oxides), where in the latter the ethylene oxide and propylene oxide repeating units may be arranged randomly or blockwise. The weight ratio of the polyester blocks and the polyether blocks of the polyetheresters of this particular embodiment is usually in the range from 1 to 100 to 100:1 in particular in the range from 1:10 to 10:1.

The polyetheresters carry at least one moiety of the formula I, e.g. from 1 to 200 or from 1 to 100 or 1 to 50 moieties of the formula I, and in particular they carry 1, 2, 3, or 4 moieties of the formula I. In the moieties of the formula I, which are attached to the terminus or to the backbone of the polyetherester, the variable A is preferably a single bond. Q is preferably O or NH. The aliphatic polyetheresters may be linear or branched or hyperbranched.

In yet a further particular embodiment of the invention the polymer P is an aliphatic polycarbonate, in particular a linear or branched or hyperbranched aliphatic polycarbonate having a polymer backbone which is a poly-($C_2$-$C_4$-alkylene carbonate), especially a poly(ethylene carbonate), a poly (propylene carbonate) or a poly(ethylene oxide-co-propylene carbonate), where in the latter the ethylene carbonate and propylene carbonate repeating units may be arranged randomly or blockwise. The poly-($C_2$-$C_4$-alkylene carbonate) carries at least one moiety of the formula I, e.g. from 1 to 200 or from 1 to 100 moieties of the formula I, and in particular it carries 1, 2, 3, or 4 moieties of the formula I. In the moieties of the formula I, which are attached to the polymer backbone of the poly-($C_2$-$C_4$-alkylene carbonate), the variable A is preferably a single bond. Q is preferably O or NH. The aliphatic polycarbonate may be linear or branched or hyperbranched.

In yet a further particular embodiment of the invention the polymer P is a polymer, wherein the polymer backbone essentially consists of carbon atoms, i.e. a polymer having a C—C-backbone, and wherein at least one carbon atom of the polymer backbone and/or at least one of the terminal atoms carry one or more of the functional moieties of the formula I as defined herein. The at least one functional moiety of the formula I is frequently attached to a carbon atom of the C—C-backbone within the polymer chain. However, one or more functional moieties of the formula I may also be attached to a terminal carbon atom of the C—C-backbone.

According to the invention, the polymer P having a C—C-backbone carries at least one moiety of the formula I, e.g. from 1 to 200 or from 1 to 100 moieties of the formula I, and in particular it carries 2 to 200 or 3 to 100 or 5 to 50 moieties of the formula I.

The polymer P having a C—C-backbone is usually formed of repeating units derived from polymerized ethylenically unsaturated monomers M (hereinafter C—C repeating units). At least one of the C—C-repeating units carries a functional moiety of the formula I which is attached via the moiety A to a carbon atom of the C—C repeating unit, which forms part of the polymer backbone.

Principally, the monomers M forming the polymer backbone may be selected from any polymerizable ethylenically unsaturated monomers having a polymerizable C=C-double bond, provided that at least one of the monomers forming the polymer backbone carries a group of the formula I attached to the polymerizable C=C-double bond or at least one functional moiety F attached to the polymerizable C=C-double bond, which has been converted in a subsequent step into the formula I by a polymeric analogous reaction. Preferably, the monomers M forming the polymer backbone comprise exclusively or at least to 95%, in particular at least 99%, based on the total weight of the polymer P having a C—C-backbone of polymerizable ethylenically unsaturated monomers having exactly one polymerizable C=C-double bond.

Hence, the polymers P having a C—C-backbone will comprise at least one repeating unit of the formula Ia, where R, R' and R" represent inert radicals such as hydrogen or $C_1$-$C_4$-alkyl, stemming from the monomer carrying the group of the formula I attached to the polymerizable C=C-double bond or at least one functional moiety attached to the polymerizable C=C-double bond.

(Ia)

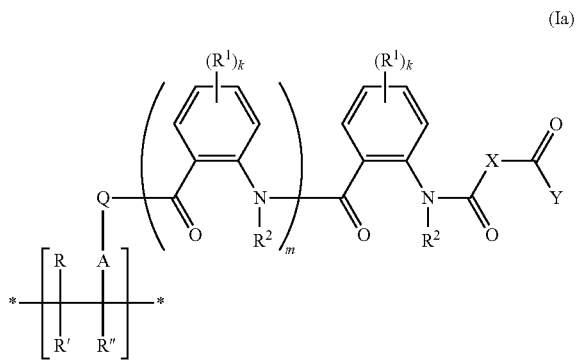

In formula Ia, the variables k, m, A, Q, $R^1$, $R^2$, $R^3$ and Y are as defined above. The symbol * indicate the point of attachment to the carbon atoms of the adjacent C—C-repeating units and R, R' and R" represent inert radicals such as hydrogen or $C_1$-$C_4$-alkyl, with particular preference given to R and R' being hydrogen and R" being hydrogen or $C_1$-$C_4$-alkyl, in particular hydrogen or methyl.

A particular embodiment relates to polymers P having a C—C-backbone, where the moiety A in formulae I and Ia is preferably a chemical bond or a divalent moiety selected from the group consisting of $C_1$-$C_6$ alkylene, —O—($C_2$-$C_6$ alkylene), —C(=O)—O—($C_2$-$C_6$ alkylene), and —$NR^3$—($C_2$-$C_6$ alkylene), where the $C_2$-$C_6$ alkylene part is attached to Q, in particular a chemical bond or a divalent moiety —C(=O)—O—($C_2$-$C_6$ alkylene), where the $C_2$-$C_6$ alkylene part is attached to Q.

A particular embodiment of the invention relates to polymers P having a C—C-backbone, which in addition to the functional moieties of the formula I have one or more poly-($C_2$-$C_4$-alkyleneoxide) radicals which are grafted onto the polymer backbone. In these poly($C_2$-$C_4$-alkyleneoxide) radicals, the $C_2$-$C_4$-alkyleneoxide repeating units preferably comprise at least 50% by weight ethyleneoxide repeating units. In particular, the poly-($C_2$-$C_4$-alkyleneoxide) radicals are polyethyleneoxide radicals. The number average weight of the poly-($C_2$-$C_4$-alkyleneoxide) radicals will generally be in the range from 150 to 5000 Dalton. The poly-($C_2$-$C_4$-alkyleneoxide) radicals may carry a terminal OH group or may be "endcapped", i.e. the hydrogen atom of the terminal OH group is replaced by a hydrocarbon radical such as $C_1$-$C_{10}$-alkyl, benzyl or $C_5$-$C_{10}$-cycloalkyl.

Preferred embodiments of the invention relate to polymers P having a C—C-backbone, which comprises repeating units, selected from polymerized monoethylenically monomers having no functional moiety of the formula I.

Suitable monomers having no functional moiety of the formula I are monoethylenically unsaturated monomers including neutral non-functional monoethylenically unsaturated monomers M1 selected from the group consisting of $C_1$-$C_{10}$-alkyl esters of $C_3$-$C_6$-monocarboxylic acids, di-($C_1$-$C_{10}$-alkyl) esters of $C_4$-$C_6$-dicarboxylic acids, $C_5$-$C_{10}$-cycloalkyl esters of $C_3$-$C_6$-monocarboxylic acids, di-($C_5$-$C_{10}$-cycloalkyl) esters of $C_4$-$C_6$-dicarboxylic acids, esters of mono-$C_1$-$C_{10}$-alkyl-terminated poly-$C_2$-$C_4$-alkyleneglycols, in particular mono-$C_1$-$C_{10}$-alkyl-terminated polyethyleneglycols, with $C_3$-$C_6$-monocarboxylic acids and vinylaromatic hydrocarbon compounds (vinylaromatic hydrocarbons);

neutral and basic functional monoethylenically unsaturated monomers M2, which in addition to the polymerizable C=C-double bond include at least one neutral or basic functional group selected from a hydroxyl group, primary or secondary amino groups, a carboxamide group and a nitrile group acidic functional monoethylenically unsaturated monomers M3, which in addition to the polymerizable C=C-double bond include at least one acidic functional group selected from carboxyl and hydroxysulfonyl group.

The esters of mono-$C_1$-$C_{10}$-alkyl-terminated poly-$C_2$-$C_4$-alkyleneglycols, in particular the esters of mono-$C_1$-$C_{10}$-alkyl-terminated polyethyleneglycols, with a $C_3$-$C_6$-monocarboxylic acid, in particular with acrylic acid or methacrylic acid, usually have a molecular weight (number average) in the range from 200 to 5000 Dalton, depending on the number of $C_2$-$C_4$-alkyleneoxide repeating units.

Examples of $C_3$-$C_6$-monocarboxylic acids are acrylic acid and methacrylic acid. Examples of $C_4$-$C_6$-dicarboxylic acids are maleinic acid, fumaric acid, itaconic acid or citraconic acid. Hence, monomers M1 are in particular the aforementioned esters of acrylic acid, methacrylic acid, maleinic acid, fumaric acid, itaconic acid or citraconic acid. Examples of suitable esters M1 of acrylic acid and methacrylic acid are methyl acrylate, ethyl acrylate, n-propylacrylate, n-butyl acrylate, iso-butyl acrylate, tert-butyl acrylate, methyl methacrylate, ethyl methacrylate, propyl methacrylate, iso-butyl methacrylate, n-butyl methacrylate, tert.-butyl methacrylate, isobornyl acrylate, isobornyl methacrylate, cyclohexyl acrylate, cyclohexyl methacrylate, methylpolyethylenglycol acrylate and methylpolyethyleneglycol methacrylate.

Examples of vinylaromatic hydrocarbons M1 include styrene, vinyltoluene and α-methyl styrene, with particular preference given to styrene.

Preferred monomers M1 are selected from $C_1$-$C_{10}$-alkyl esters of acrylic acid, $C_1$-$C_{10}$-alkyl esters of methacrylic acid, esters of mono-$C_1$-$C_{10}$-alkyl-terminated poly-$C_2$-$C_4$-alkyleneglycols, in particular mono-$C_1$-$C_{10}$-alkyl-terminated polyethyleneglycols, with acrylic acid, esters of mono-$C_1$-$C_{10}$-alkyl-terminated poly-$C_2$-$C_4$-alkyleneglycols, in particular mono-$C_1$-$C_{10}$-alkyl-terminated polyethyleneglycols, with methacrylic acid and vinylaromatic hydrocarbons, in particular styrene.

Examples of suitable monomers M2 include
- hydroxy-$C_2$-$C_4$-alkyl esters of $C_3$-$C_6$-monocarboxylic acids, in particular hydroxy-$C_2$-$C_4$-alkyl esters of acrylic acid or methacrylic acid such as 2-hydroxyethyl acrylate, 2-hydroxyethyl methacrylate, 2- or 3-hydroxypropyl acrylate, 2- or 3-hydroxypropyl methacrylate, 4-hydroxybutyl acrylate and 4-hydroxybutyl methacrylate;
- N-(hydroxy-$C_2$-$C_4$-alkyl) amides of $C_3$-$C_6$-monocarboxylic acids, in particular N(hydroxy-$C_2$-$C_4$-alkyl) amides of acrylic acid or methacrylic acid such as N-(2-hydroxyethyl) acrylamide, N-(2-hydroxyethyl) methacrylamide, N-(2- or 3-hydroxypropyl) acrylamide, N-(2- or 3-hydroxypropyl) methacrylamide, N-(4-hydroxybutyl) acrylamide and N-(4-hydroxybutyl) methacrylamide;
- amino-$C_2$-$C_4$-alkyl esters of $C_3$-$C_6$-monocarboxylic acids, in particular amino-$C_2$-$C_4$-alkyl esters of acrylic acid or methacrylic acid such as 2-aminoethyl acrylate, 2-aminoethyl methacrylate, 2- or 3-aminopropyl acrylate, 2- or 3-aminopropyl methacrylate, 4-aminobutyl acrylate and 4-aminobutyl methacrylate;
- N-(amino-$C_2$-$C_4$-alkyl) amides of $C_3$-$C_6$-monocarboxylic acids, in particular N(amino-$C_2$-$C_4$-alkyl) amides of acrylic acid or methacrylic acid such as N-(2-aminoethyl) acrylamide, N-(2-aminoethyl) methacrylamide, N-(2- or 3-aminopropyl) acrylamide, N-(2- or 3-aminopropyl) methacrylamide, N-(4-aminobutyl) acrylamide and N-(4-aminobutyl) methacrylamide;
- primary amides of $C_3$-$C_6$-monocarboxylic acids such as acrylamide and methacrylamide;
- monoethylenically unsaturated $C_3$-$C_6$-mononitriles such as acrylonitrile, methacrylonitrile;

Examples of suitable monomers M3 include
- $C_3$-$C_6$-monocarboxylic acids such as acrylic acid and methacrylic acid;
- $C_4$-$C_6$-dicarboxylic acids such as maleinic acid, fumaric acid, itaconic acid or citraconic acid;
- monoethylenically unsaturated sulfonic acids such as vinylsulfonic acid, allylsulfonic acid, methallylsulfonic acid, styrenesulfonic acid.

A particular group of embodiments of the invention relates to polymers P having a C—C-backbone, which comprises repeating units derived from monomers M1, in particular repeating units derived from monomers M1, which are selected from $C_1$-$C_{10}$-alkyl (meth)acrylates, $C_1$-$C_{10}$-alkyl-(poly-$C_2$-$C_4$-alkyleneglycol) (meth)acrylates, and polymerized vinylaromatic hydrocarbons such as styrene.

Another particular group of embodiments of the invention relates to polymers P having a C—C-backbone, which comprises repeating units derived from monomers M1, in particular repeating units derived from monomers M1, which are selected from $C_1$-$C_{10}$-alkyl (meth)acrylates, $C_1$-$C_{10}$-alkyl-(poly-$C_2$-$C_4$-alkyleneglycol) (meth)acrylates, and polymerized vinylaromatic hydrocarbons such as styrene, and repeating units derived from monomers M2, in particular from monomers M2 selected from the group consisting of hydroxy-$C_2$-$C_4$-alkyl esters of $C_3$-$C_6$-monocarboxylic acids, N-(hydroxy-$C_2$-$C_4$-alkyl) amides of $C_3$-$C_6$-monocarboxylic acids, amino-$C_2$-$C_4$-alkyl esters of $C_3$-$C_6$-monocarboxylic acids and N-(amino-$C_2$-$C_4$-alkyl) amides of $C_3$-$C_6$-monocarboxylic acids.

Amongst polymers P having a C—C-backbone, particular preference is given to those, where the repeating units derived from monomers M1 make up from 10 to 90% by weight, in particular from 30 to 80% by weight of the polymer P having a C—C-backbone.

Particularly preferred polymers P having a C—C-backbone comprise
- 10 to 90% by weight, in particular from 30 to 80% by weight of the polymer P having a C—C-backbone of repeating units derived from monomers M1;
- 10 to 80% by weight, in particular from 20 to 60% by weight of the polymer P having a C—C-backbone of repeating units of the formula Ia;
- 0 to 80% by weight, in particular from 0 to 50% by weight of the polymer P having a C—C-backbone of repeating units derived from monomers M2;
- 0 to 20% by weight, in particular from 0 to 10% by weight of the polymer P having a C—C-backbone of repeating units derived from monomers M3.

With regard to their capability of acting as a dispersant, preference is given to polymers P having a C—C-backbone, which have a number average molecular weight $M_N$ in the range from 500 to 100.000 Dalton, in particular from 800 to 80.000 Dalton, especially from 1000 to 50.000 Dalton. The weight average molecular weight $M_W$ of the polymers P" is generally the range from 600 to 500.000 Dalton, in particular from 1000 to 300.000 Dalton, especially from 1200 to 150.000 Dalton. The polydispersity $M_W/M_N$ is generally in the range from 1.05 to 5, preferably from 1.1 to 4 and especially from 1.2 to 3.

With regard to their capability of acting as a dispersant, preference is given to polymers P having a C—C-backbone, which are characterized by an amine number in the range from 3 to 500 mg KOH per gramm of polymer P having a C—C-backbone, in particular from 10 to 300 mg KOH per gramm of polymer P having a C—C-backbone.

Besides being used as a dispersant, the polymers P of the present invention may also be used as a crosslinking agent, as a rheology modifier, as an impact modifier, as a chain extender or as a building block for the preparation of block- or graft-copolymers.

Polymers P according to the present invention are preferably obtained by a process which comprises
a) providing a polymer P.1 carrying at least one radical of the formula I.1:

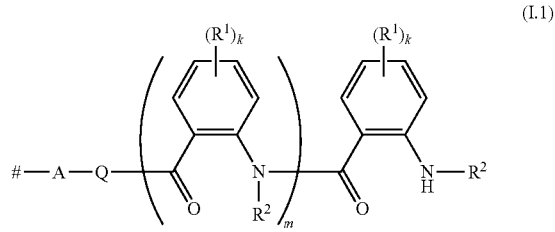

bound to one of the termini and/or backbone of the polymer,
where # indicates the point of attachment to the terminus and/or to the polymer backbone and
where A, Q, k, m, $R^1$ and $R^2$ are as defined above,
b) further reacting the polymer P.1 obtained in step a) with an acid anhydride of formula (IV)

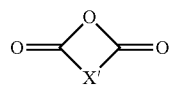
(IV)

where X' has one of the aforementioned meanings given for X and if X' carries 2, 3 or 4 COOH groups, two COOH groups may form an anhydride group.

Preferred acid anhydrides (IV) include aliphatic acid anhydrides, such as malonic anhydride, succinic anhydride, glutaric anhydride, 2-methylglutaric anhydride, 3-methylglutaric anhydride, adipic anhydride, pimelic anhydride, azelaic anhydride, octadecenylsuccinic anhydride, maleic anhydride, itaconic anhydride or citraconic anhydride, cycloaliphatic acid anhydrides, such as cis- or trans-1,2-cyclohexanedicarboxylic anhydride, aromatic acid anhydrides, such as phthalic anhydride, 1,2,4-benzenetricarboxylic anhydride or pyromellitic dianhydride. Especially preferred acid anhydrides are succinic anhydride, octadecenylsuccinic anhydride, maleic anhydride, phthalic anhydride and 1,2,4-benzenetricarboxylic anhydride.

The amount of the acid anhydride (IV) is generally chosen such that the molar ratio of the acid anhydride (IV) to the amount of functional groups 1.1 on the polymer P.1 is from 10:1 to 1:10, in particular from 5:1 to 1:5, especially from 3:1 to 1:3.

The reaction of the polymer P.1 with the acid anhydride (IV) is generally performed in the presence of a suitable catalyst which promotes the reaction of the primary or secondary amines of the radical 1.1 with the acid anhydrides. Suitable catalysts include alkalimetal hydroxides such as sodium or potassium hydroxide, alkalimetal carbonates such as sodium or potassium carbonate, tertiary amines, e.g. tri-$C_1$-$C_6$-alkylamines such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines such as dimethylcyclohexyhamine, di-$C_1$-$C_6$-alkylpyridines such as 4-dimethylaminopyridine, tin compound catalysts, such as dibutyltindioctoate and dibutyltindilaurate.

The amount of catalyst is generally from 0.01 to 2% by weight, in particular from 0.1 to 1% by weight, based on the total amount of polymer P.1 and the acid anhydride (IV).

The reaction of the polymer P.1 with the acid anhydride (IV) is generally performed at temperatures ranging from 40 to 120° C., in particular from 60 to 100° C.

The reaction of the polymer P.1 with the acid anhydride (IV) may be performed in bulk or in solvent. Suitable solvents are those which are inert under the used reaction conditions, examples including esters, hydrocarbons and mixtures thereof. Preferably, the reaction is performed in bulk, i.e. the concentration of the reactants is at least 90% by weight, based on the weight of the reaction mixture.

The reaction of the polymer P.1 with the acid anhydride (IV) can be carried out under reduced, normal or elevated pressure. Generally, atmospheric pressure is preferred.

The polymers P.1 carrying at least one radical of the formula I.1 are known from the prior art cited in the introductory part of the present application and can be prepared by analogy to the methods described therein.

Polymers P.1, which are aliphatic polyethers, in particular poly(alkylene oxides) are e.g. known from U.S. Pat. No. 4,180,644, U.S. Pat. No. 4,191,706, U.S. Pat. No. 4,191,835, U.S. Pat. No. 4,247,677, U.S. Pat. No. 4,260,729 and US 2003212291.

Polymers P.1, which are aliphatic polyesters are e.g. known from EP 21569.

Polymers P.1, which are aliphatic polycarbonates are e.g. known from U.S. Pat. No. 5,231,149.

Apart from that, polymers P.1 are preferably obtained by reacting a polymer P' having at least one functional moiety of the formula A-Q-H attached to one of the termini and/or to the backbone of the polymer P' with a compound of the formulae II or III

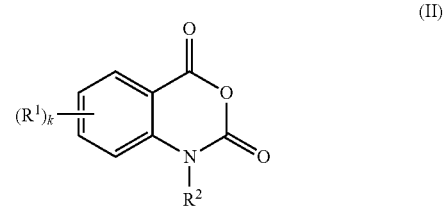
(II)

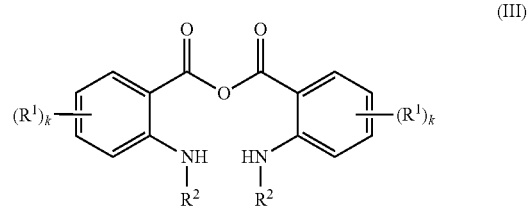
(III)

where A, Q, k, $R^1$ and $R^2$ are as defined herein and where the polymer P' does not have a functional group of the formula I.1.

Examples of suitable compounds of the formula II are isatoic anhydride, N-methylisatoic anhydride, N-ethylisatoic anhydride, aminoisatoic anhydride, fluoroisatoic anhydride, chloroisatoic anhydride, bromoisatoic anhydride, carboxylic isatoic anhydride, nitroisatoic anhydride, hydroxyisatoic anhydride, methoxyisatoic anhydride, 1-(methylsulfonylmethyl)isatoic anhydride, (4-pyridinyl)isatoic anhydride, 1-phenyl-2H-3,1-benzoxazine-2,4(1H)-dione, chloro-1-ethyl(methyl)-2H-3,1-benzoxazine-2,4(1H)dione, isatoic anhydride carboxylic acid methyl ester, Examples of suitable compounds of the formula III are isatoic acid anhydride (anhydride of anthranilic acid).

Polymers P.1 may also be prepared by reacting a polymer P' having at least one functional moiety of the formula A-Q-H attached to one of the termini and/or to the backbone of the polymer P' with a anthranilic acid or an ester thereof of the formulae II'

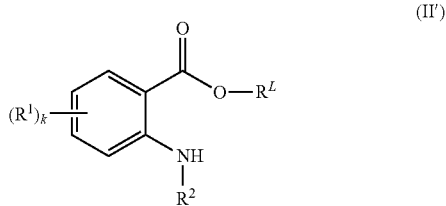

(II')

where A, Q, k, $R^1$ and $R^2$ are as defined herein and where the polymer P' does not have a functional group of the formula I.1 and wherein $R^L$ is hydrogen or a hydrocarbon radical having 1 to 8 carbon atoms such as $C_1$-$C_6$-alkyl, phenyl, $C_3$-$C_6$-cycloalkyl or benzyl and wherein $R^L$ is preferably hydrogen or $C_1$-$C_4$-alkyl, especially hydrogen, methyl or ethyl.

The polymer P' forms the backbone of the polymer P. Hence, the polymer P' is preferably selected from the group consisting of polyesters, in particular aliphatic polyesters, polyethers, in particular poly-$C_2$-$C_4$-alkylene oxides, polycarbonates, in particular aliphatic polycarbonates, and polymers having a C—C-backbone, in particular those which comprise repeating units M1, selected from polymerized $C_1$-$C_{10}$-alkyl (meth)acrylates, polymerized $C_1$-$C_{10}$-alkyl-(poly-$C_2$-$C_4$-alkyleneglycol) (meth)acrylates and polymerized vinylaromatic compounds such as styrene, especially those, where the amount of repeating units M1 make up from 10 to 90% by weight, based on the total weight of the polymer P', especially from 30 to 80% by weight, based on the total weight of the polymer P'. The aforementioned polyesters, polyethers, polycarbonates and polymers having a C—C-backbone carry at least one functional moiety of the formula A-Q-H, in particular from 1 to 200 or 2 to 200 or 3 to 200, especially 1 to 100 or 2 to 100 or 3 to 100, functional moieties of the A-Q-H, where the functional moieties of the A-Q-H may be bound either to one or more of the termini of the polymer backbone or at any other position of the polymer backbone.

In a particular embodiment of the invention the polymer P' is an aliphatic polyether, in particular a poly-($C_2$-$C_4$-alkylene oxide), especially a poly(ethylene oxide), a poly(propylene oxide) or a poly(ethylene oxide-co-propylene oxide), where in the latter the ethylene oxide and propylene oxide repeating units may be arranged randomly or blockwise. The poly-($C_2$-$C_4$-alkylene oxide) P' carries at least one moiety A-Q-H, in particular an OH or $NH_2$-group, e.g. from 1 to 200 or from 1 to 100 moieties of the formula I, and in particular it carries 1, 2, 3, or 4 moieties A-Q-H. In the polyethers P', the moieties A-Q-H are preferably OH or $NH_2$. The aliphatic polyether P' may be linear or branched or hyperbranched.

Polyethers P' are commercially available, e.g. the Jeffamine® grades from Huntsman, the Boltorn® grades from Perstorp, the Pluriol® grades from BASF, the Pluronic® grades from BASF and the Lutensol® grades from BASF.

In another particular embodiment of the invention the polymer P' is an aliphatic polyester, in particular a linear or branched or hyperbranched aliphatic polyester P', selected from a) aliphatic polyesters, where the majority, in particular at least 70% of repeating units are units of the polyester backbone are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups; and b) aliphatic polyesters, where the majority, in particular at least 70% of repeating units are units of the polyester backbone are derived from one or more, e.g. 1, 2 or 3 aliphatic $C_4$-$C_{10}$ lactones, or a combination of one or more, e.g. 1, 2 or 3 aliphatic $C_4$-$C_{10}$ lactones with ate least one further component, selected from $C_2$-$C_{10}$ dicarboxylic acids, $C_2$-$C_{10}$ aliphatic diols, and $C_3$-$C_{10}$ aliphatic or $C_5$-$C_{10}$-cycloaliphatic polyols having 3, 4, 5 or 6 hydroxyl groups.

The aliphatic polyesters P' carry at least one moiety A-Q-H, e.g. from 1 to 200 or from 1 to 100 moieties A-Q-H, and in particular it carries from 1 to 50 moieties A-Q-H. In the polyesters P', the moieties A-Q-H are preferably OH or $NH_2$.

Polyesters P' are commercially available, e.g. the Boltorn® grades form Perstorp, or they can be prepared by co-condensation of aliphatic $C_2$-$C_{10}$ dicarboxylic acids or ester forming derivatives thereof with $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups, or by reacting lactones with hydroxyl compounds having 1, 2, 3, 4, 5 or 6 or more hydroxyl groups.

In a further particular embodiment of the invention the polymer P' is an aliphatic polyetherester, in particular a linear or branched or hyperbranched aliphatic polyetherester, selected from a) aliphatic polyetheresters, where the majority, in particular at least 70% of repeating units are units of the polyester blocks are derived from aliphatic $C_2$-$C_{10}$ dicarboxylic acids and $C_2$-$C_{10}$ aliphatic diols, and optionally $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise; and b) aliphatic polyetheresters, where the majority, in particular at least 70% of repeating units are units of the polyester blocks are derived from one or more, e.g. 1, 2 or 3 aliphatic $C_4$-$C_{10}$ lactones, or a combination thereof with at least one further component, selected from $C_2$-$C_{10}$ dicarboxylic acids, $C_2$-$C_{10}$ aliphatic diols, and $C_3$-$C_{10}$ aliphatic or $C_5$-$C_{10}$-cycloaliphatic polyols having 3, 4, 5 or 6 hydroxyl groups, and where the polyether blocks are poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise.

The weight ratio of the polyester blocks and the polyether blocks is usually in the range from 1 to 100 to 100:1 in particular in the range from 1:10 to 10:1.

The aliphatic polyetheresters P' carry at least one moiety A-Q-H, e.g. from 1 to 200 or from 1 to 100 moieties A-Q-H, and in particular it carries from 1 to 50 moieties A-Q-H. In the polyetheresters P', the moieties A-Q-H are preferably OH or $NH_2$.

Aliphatic polyetheresters P' can be prepared by co-condensation of the aforementioned ester forming monomers with OH terminated aliphatic polyethers such as poly-($C_2$-$C_4$-alkylene oxides), especially poly(ethylene oxides), poly(propylene oxides) or poly(ethylene oxide-co-propylene oxides), where in the latter the ethylene oxide and propylene oxide repeating units may be arranged randomly or blockwise.

In yet a further particular embodiment of the invention the polymer P' is an aliphatic polycarbonate, in particular a linear or branched or hyperbranched aliphatic polycarbonate having a polymer backbone which is a poly-($C_2$-$C_4$-alkylene carbonate), especially a poly(ethylene carbonate), a poly (propylene carbonate) or a poly(ethylene oxide-co-propylene carbonate), where in the latter the ethylene carbonate and propylene carbonate repeating units may be arranged randomly or blockwise. The poly-($C_2$-$C_4$-alkylene carbonate) P' carries at least one moiety A-Q-H, e.g. from 1 to 200 or from 1 to 100 moieties A-Q-H, and in particular it carries 1, 2, 3, or 4 moieties A-Q-H. In the polycarbonates P', the moieties A-Q-H are preferably OH or $NH_2$. The aliphatic polycarbonate P' may be linear or branched or hyperbranched.

Polycarbonates P' are commercially available, e.g. the Oxymer® grades from Perstorp.

In yet a further particular embodiment of the invention the polymer P' is polymer, wherein the polymer backbone essentially consists of carbon atoms, i.e. a polymer having a C—C-backbone, and wherein the polymer backbone and/or at least one of the terminal atoms carry one or more of the functional moieties A-Q-H as defined herein. According to the invention, the polymer P' carries at least one moiety A-Q-H, e.g. from 1 to 200 or from 1 to 100 moieties A-Q-H, and in particular it carries 2 to 200 or 3 to 100 or 5 to 50 moieties A-Q-H.

The polymer P' is usually formed of repeating units derived from polymerized ethylenically unsaturated monomers M (hereinafter C—C repeating units). At least one of the C—C-repeating units carries a functional moiety A-Q-H which is attached via the moiety A to a carbon atom of the C—C repeating unit, which forms part of the polymer backbone.

Principally, the monomers M forming the polymer backbone may be selected from any polymerizable ethylenically unsaturated monomers having a polymerizable C═C-double bond, provided that either at least one of the monomers forming the polymer backbone carries a group A-Q-H attached to the polymerizable C═C-double bond. Preferably, the monomers M forming the polymer backbone comprise exclusively or at least to 95%, in particular at least 99%, based on the total weight of the polymer P' of polymerizable ethylenically unsaturated monomers having exactly one polymerizable C═C-double bond.

Hence, the polymers P' will comprise at least one repeating unit of the formula Ib, where R, R' and R" represent inert radicals such as hydrogen or $C_1$-$C_4$-alkyl, stemming from the monomer carrying the group A-Q-H attached to the polymerizable C═C-double bond.

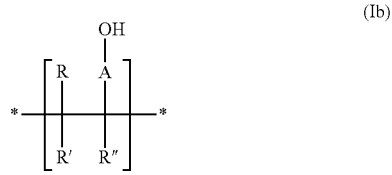

(Ib)

In formula Ib, the variables A and Q are as defined above. The symbol * indicate the point of attachment to the carbon atoms of the adjacent C—C-repeating units and R, R' and R" represent inert radicals such as hydrogen or $C_1$-$C_4$-alkyl, with particular preference given to R and R' being hydrogen and R" being hydrogen or $C_1$-$C_4$-alkyl, in particular hydrogen or methyl.

Preferred embodiments of the invention relate to polymers P', which in addition to the repeating units of formula Ib comprises repeating units, derived from polymerized monoethylenically monomers having no functional moiety A-Q-H.

Suitable monomers having no functional moiety A-Q-H are monoethylenically unsaturated monomers including the aforementioned monomers M1 and M3 and monomers M2, where the functional group is different from OH or $NH_2$.

Preferred monomers M1 in polymers P' are selected from $C_1$-$C_{10}$-alkyl esters of acrylic acid, $C_1$-$C_{10}$-alkyl esters of methacrylic acid, $C_1$-$C_{10}$-alkyl-(poly-$C_2$-$C_4$-alkyleneglycol) (meth)acrylates and vinylaromatic hydrocarbons, in particular styrene.

Particularly preferred embodiments of the invention relate to polymers P', which comprises repeating units derived from monomers M1, in particular repeating units derived from monomers M1, which are selected from $C_1$-$C_{10}$-alkyl (meth)acrylates, polymerized $C_1$-$C_{10}$-alkyl-(poly-$C_2$-$C_4$-alkyleneglycol) (meth)acrylates and polymerized vinylaromatic compounds such as styrene, and repeating units derived from monomers M2, which have a primary amino group or a hydroxyl group. Monomers M2 having a primary amino group or a hydroxyl group are hereinafter termed monomers M2a, while monomers M2 having no primary amino group or hydroxyl group are hereinafter termed monomers M2b.

Particularly preferred embodiments of the invention also relate to polymers P', which comprises repeating units derived from monomers M1, in particular repeating units derived from monomers M1, which are selected from $C_1$-$C_{10}$-alkyl (meth)acrylates, polymerized $C_1$-$C_{10}$-alkyl-(poly-$C_2$-$C_4$-alkyleneglycol) (meth)acrylates and polymerized vinylaromatic compounds such as styrene, and repeating units derived from monomers M2a, in particular from monomers M2a selected from the group consisting of hydroxy-$C_2$-$C_4$-alkyl esters of $C_3$-$C_6$-monocarboxylic acids, N-(hydroxy-$C_2$-$C_4$-alkyl) amides of $C_3$-$C_6$-monocarboxylic acids, amino-$C_2$-$C_4$-alkyl esters of $C_3$-$C_6$-monocarboxylic acids and N-(amino-$C_2$-$C_4$-alkyl) amides of $C_3$-$C_6$-monocarboxylic acids.

Amongst polymers P', particular preference is given to those, where the repeating units derived from monomers M1 make up from 10 to 90% by weight, in particular from 30 to 80% by weight of the polymer P'.

Particularly preferred polymers P' comprise
  10 to 90% by weight, in particular from 30 to 80% by weight of the polymer P' of repeating units derived from monomers M1;
  10 to 80% by weight, in particular from 20 to 60% by weight of the polymer P' of repeating units derived from monomers M2a;
  0 to 80% by weight, in particular from 0 to 50% by weight of the polymer P' of repeating units derived from monomers M2b;
  0 to 20% by weight, in particular from 0 to 10% by weight of the polymer P' of repeating units derived from monomers M3.

Preference is given to polymers P', which have s a number average molecular weight $M_N$ in the range from 500 to 100.000 Dalton, in particular from 800 to 80.000 Dalton, especially from 1000 to 50.000 Dalton. The weight average molecular weight $M_W$ of the polymers P' is generally the range from 600 to 500.000 Dalton, in particular from 1000 to 300.000 Dalton, especially from 1200 to 150.000 Dalton.

The polydispersity $M_W/M_N$ of polymers P' is generally in the range from 1.05 to 5, preferably from 1.1 to 4 and especially from 1.2 to 3.

Polymers P' having a C—C-backbone and carrying at least one group A-Q-H are known, and commercially available, e.g. the Acryflow grades of Lyondell Chem or can be prepared by radical copolymerization of monomers M1 and M2a in the presence of suitable initiators and optionally regulators. Suitable polymers P' are e.g. known from WO 00/40630, WO 03/046029, WO 2006/074969, WO 2011/120947.

The amount of the compound II or III is generally chosen such that the molar ratio of the compound II or III to the amount of groups A-Q-H in polymer P' is from 10:1 to 1:10, in particular from 5:1 to 1:5, especially from 3:1 to 1:3.

The reaction of the polymer P' with the compound of formulae II or III is generally performed in the presence of a suitable catalyst which promotes the reaction of the groups A-Q-H with the carbonyl groups in II or III. Suitable catalysts include alkalimetal hydroxides such as sodium or potassium hydroxide, alkalimetal carbonates such as sodium or potassium carbonate, tertiary amines, e.g. tri-$C_1$-$C_6$-alkylamines such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines such as dimethylcyclohexylamine, di-$C_1$-$C_6$-alkylpyridines such as 4-dimethylaminopyridine, tin compound catalysts, such as dibutyltindioctoate and dibutyltindilaurate.

The amount of catalyst is generally from 0.01 to 2% by weight, in particular from 0.1 to 1% by weight, based on the total amount of polymer P and the compound of formulae II or III.

The reaction of the polymer P' with the compound of formulae II or III is generally performed at temperatures ranging form 60 to 180° C., in particular from 80 to 140° C.

The reaction of the polymer P' with the compound of formulae II or III may be performed in bulk or in solvent. Suitable solvents are those with are inert under reaction conditions, examples including esters, hydrocarbons and mixtures thereof. Preferably, the reaction is performed in bulk, i.e. the concentration of the reactants is at least 90% by weight, based on the weight of the reaction mixture.

Polymers P, which in addition to the functional moieties of the formula I have one ore more poly-($C_2$-$C_4$-alkyleneoxide) radicals grafted onto the polymer backbone, can be prepared by using suitable polymers P' having one ore more poly-($C_2$-$C_4$-alkyleneoxide) radicals which are grafted onto the polymer backbone. Preferably, such polymers P are prepared by reacting a polymer P having $C_1$-$C_{10}$-alkylester moieties, e.g. moieties of polymerized $C_1$-$C_{10}$-alkyl(meth) acrylates, with a poly-($C_2$-$C_4$-alkyleneglycol), in particular an "endcapped" poly-($C_2$-$C_4$-alkyleneglycol), in particular a mono-$C_1$-$C_{10}$-alkyl poly-($C_2$-$C_4$-alkyleneglycol). Thereby, at least some of the $C_1$-$C_{10}$-alkylester moieties are converted into poly-($C_2$-$C_4$-alkyleneglycol) ester moieties, i.e. moieties, where the poly($C_2$-$C_4$-alkyleneglycol) is attached to the polymer backbone via a carbonyl group.

As pointed out above, the thus obtained polymers P are particularly suitable as dispersants, in particular as dispersants for fine particulate solids such as pigments and fillers.

The invention also relates to liquid compositions of fine particulate solids, which contain at least one polymer P and the salts thereof as a dispersant.

The polymers P and the salts thereof can be used as dispersant in a broad application fields, such as coatings, inks, electronic materials, especially in low temperature and low viscosity applications. The polymers P and the salts thereof can be used in solvent based systems such as in solvent based organic and inorganic pigments dispersion e.g. in alkyd, CAB (cellulose acetate butyrate), UV (Ultraviolet) and TPA (thermoplastic acrylate) paint systems, in general industrial coatings especially in automotive coatings, as well as in printing inks and graphic arts.

The invention relates in particular to liquid compositions in the form of a dispersion comprising a fine particulate solid material, in particular a pigment or filler, which is dispersed in a liquid diluent, which composition further contains a polymer P and the salts thereof as defined herein.

The invention relates in particular to liquid compositions in the form of a liquid coating composition, which comprises a fine particulate solid material, in particular a pigment or filler, which is dispersed in a liquid diluent, which composition further contains a polymer P and the salts thereof as defined herein and a binder polymer or prepolymer.

The invention also relates in particular to liquid compositions in the form of a liquid ink composition, which comprises a fine particulate solid material, in particular a pigment or filler, which is dispersed in a liquid diluent, which composition further contains a polymer P and the salts thereof as defined herein and a binder polymer or prepolymer.

Suitable salts of polymer P according to the present invention are base addition salts resulting from the partial or complete neutralization of the polymer P with organic or inorganic bases. Preferably, the degree of neutralization is in the range of from 5 to 100%.

Examples of suitable organic bases for the partial or complete neutralization of the polymer P include alkylamines such as monoalkylamines, for example ethylamine, dialkylamines, for example diisopropylamine, trialkylamines, for example triethylamine, diisopropylethylamine or tributylamine, as well as alkanolamines such as monoalkanolamines, for example ethanolamine or 2-amino-2-methyl-1-propanol, N,N-dialkylalkanolamines, for example N,N-dimethylethanolamine or N,N-dimethylaminomethylpropanol, dialkanolamines, for example diethanolamine and trialkanolamines, for example triethanolamine.

Preferred organic bases are 2-amino-2-methyl-1-propanol, ethanolamine, triethylamine and tributylamine.

Examples of suitable inorganic bases for the partial or complete neutralization of the polymer P are alkali metal or alkaline earth metal hydroxides, for example sodium, potassium, lithium or calcium hydroxide, alkali metal or alkaline earth metal carbonates, for example sodium, potassium or calcium carbonate, and ammonia.

Preferred inorganic bases are sodium hydroxide, potassium hydroxide, lithium hydroxide and ammonia.

Suitable solid fine particular materials include but are not limited to the group consisting of pigments and fillers. Pigments may be inorganic or organic. Pigments included colored pigments and pearlescents.

The size of the fine particulate material is preferably in the micrometer range, e.g. the weight average particle diameter may range from 1 μm to 2000 μm, in particular form 2 μm to 1000 μm or from 5 μm to 500 μm. The weight average particle diameter may be determined by sieving analysis. The weight average particle diameter may be also be determined by light scattering methods.

Examples of suitable organic pigments are pigments and pearlescent flakes selected from the group consisting of azo, disazo, naphthol, benzimidazolone, azocondensation, metal complex, isoindolinone, and isoindoline pigments, the chinophthalon pigment, dioxazine pigment and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, and the like. Further examples of organic pigments can be found in the monograph: W. Herbst, K. Hunger "*Industrielle Organische Pigmente*" $2^{nd}$ Edition, 1995, *VCH Verlagsgesellschaft*, ISBN: 3-527-28744-2.

Examples of suitable inorganic pigments are e.g. metallic flakes, such aluminium, aluminium oxide, calcium carbonate, silicon oxide and silicates, iron(III)oxide, chromium(III)oxide, titanium(IV)oxide, zirconium(IV)oxide, zinc oxide, zinc sulphide, zinc phosphate, mixed metal oxide phosphates, molybdenum sulphide, cadmium sulphide, carbon black or graphite, vanadates, such as bismuth vanadate, chromates, such as lead(IV)chromate, and molybdates, such as lead(IV)molybdate, and mixtures, crystal forms or modifications thereof, such as rutil, anatas, mica, talcum or kaolin.

Suitable fillers are calcium carbonate, silicates, glass fibres, glass beads, talc, kaolin, mica, barium sulphate, metal oxides and hydroxides, carbon black, graphite, wood powders, powders and fibres of other natural products, synthetic fibres, The liquid diluent present in the dispersion will depend on the field of application in a known manner. The dispersants of the invention are particular useful in dispersions, where the diluent is selected from commonly used solvents in coatings technology. For water based formulations the diluent comprises water and may, aside from water, further comprise polar, water-miscible solvents such as $C_1$-$C_4$ alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol or propylene glycol. For solvent based formulations, preferably less polar solvents like aliphatic hydrocarbons, esters like butyl acetate, or glycol ethers like methoxypropylene glycol or glycol ether esters like methoxypropylene glycol acetate are used and mixtures thereof are used as liquid diluents.

Preferably, the weight ratio of fine particulate solid material to polymer P and the salts thereof in the liquid composition may range from 100:1 to 1:50, in particular from 30:1 to 1:10.

In a particular embodiment of the invention, the liquid composition comprises
i) 1 to 70% by weight, in particular 2 to 50% by weight, based on the total weight of the liquid composition, of at least one fine particulate solid material, selected from the group consisting of pigments and fillers;
ii) 0.5 to 50% by weight, in particular from 1 to 30% by weight, based on the total weight of the liquid composition, of at least one polymer P as defined herein optionally in the form of a salt;
iii) 10 to 98.5%, in particular from 20 to 97% by weight, based on the total weight of the liquid composition, of at least one liquid diluent.

Depending on the intended use, the liquid composition may further comprise binders and/or one or more conventional additives depending on the intended use. Conventional additives included e.g. plasticisers, lubricants, emulsifiers, humectants, rheology additives, catalysts, flow auxiliaries, optical brighteners, flame retardants, preservatives, antistatic agents or blowing agents.

The liquid dispersion may be in the form of a mill base. Such a millbase contains the fine particulate solid, the polymer P and the salts thereof and the liquid diluent and optionally additives but generally mill base will not contain binders.

The liquid dispersion may also be in the form of a coating composition. Such a coating composition contains the fine particulate solid, the polymer P and the salts thereof and the liquid diluent and additionally one or more binders, e.g. film-forming polymers or prepolymers which form a film upon curing. Coating composition may optionally contain conventional additives conventionally used in coating technology, e.g. plasticisers, lubricants, emulsifiers, rheology additives, catalysts, flow auxiliaries, optical brighteners, flame retardants, preservatives, antistatic agents or blowing agents.

The liquid dispersion may also be in the form of an ink, e.g. a printing ink or a gravure ink. Such an ink contains the fine particulate solid, the polymer P and the salts thereof and the liquid diluent and additionally one or more binders conventionally used in ink technology, e.g. film-forming polymers or prepolymers which form a film upon curing. Coating composition may optionally contain conventional additives, e.g. plasticisers, lubricants, emulsifiers, humectants, rheology additives, humectants, preservatives and antistatic agents.

Suitable binders are the ones customarily used, for example the ones described in *Ullmann's Encyclopedia of Industrial Chemistry*, 5th Edition, Vol. A18, pp. 368-426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Also resins curable by radiation or air-drying resins can be used. Binders may also be derived from polyvinylalcohol and polyvinylbutyral.

If cold- or hot-curable binders are used, the addition of a curing catalyst may be advantageous. Suitable catalysts that accelerate the curing of binders are described, for example, in *Ullmann's, Vol. A*18, loc. cit., p. 469.

Preference is given to coating compositions comprising a polymer P and the salts thereof and a cross linkable resin. Examples of coating compositions containing specific binders are:

Paints based on cold- or hot-cross linkable alkyd, acrylate, polyester, epoxy or melamine resins or mixtures of such resins, if desired with addition of a curing catalyst;

Two-component polyurethane paints based on hydroxyl-containing acrylate, polyester or polyether resins and aliphatic or aromatic isocyanates, isocyanurates or polyisocyanates;

One-component polyurethane paints based on blocked isocyanates, isocyanurates or polyisocyanates which are deblocked during baking, if desired with addition of a melamine resin;

One-component polyurethane paints based on a trisalkoxycarbonyl triazine cross linker and a hydroxyl group containing resin such as acrylate, polyester or polyether resins;

One-component polyurethane paints based on aliphatic or aromatic urethane acrylates or polyurethane acrylates having free amino groups within the urethane structure and melamine resins or polyether resins, if necessary with curing catalyst;

Two-component paints based on (poly)ketimines and aliphatic or aromatic isocyanates, isocyanurates or polyisocyanates;

Two-component paints based on (poly)ketimines and an unsaturated acrylate resin or a polyacetoacetate resin or a methacrylamidoglycolate methyl ester;

Two-component paints based on carboxyl- or amino-containing polyacrylates and polyepoxides;

Two-component paints based on acrylate resins containing anhydride groups and on a polyhydroxy or polyamino component;

Two-component paints based on acrylate-containing anhydrides and polyepoxides;

Two-component paints based on (poly) oxazolines and acrylate resins containing anhydride groups, or unsaturated acrylate resins, or aliphatic or aromatic isocyanates, isocyanurates or polyisocyanates;

Two-component paints based on unsaturated polyacrylates and polymalonates;

Thermoplastic polyacrylate paints based on thermoplastic acrylate resins or externally cross linking acrylate resins in combination with etherified melamine resins; and Paint systems based on siloxane-modified or fluorine-modified acrylate resins.

The coating composition preferably comprises 0.01 to 100.0 parts by weight of the combined components i) and ii), i.e. fine particulate solid and polymer P and the salts thereof in the composition, in particular 0.05 to 50.0 parts, especially 0.1 to 20.0 parts, per 100 parts by weight of solid binder.

For preparing the liquid composition of the invention, the pigments are generally dispersed in the liquid diluent in the presence of the polymer P and the salts thereof. The dispersion can be achieved by using conventional techniques, such as high speed mixing, ball milling, sand grinding, attritor grinding or two or three roll milling. The resulting pigment dispersion may have a pigment to dispersant weight ratio in the above range. The thus obtained dispersion is also termed as a mill-base.

For preparing the coating composition or an ink the millbase will generally be incorporated, e.g. by mixing, into a liquid composition of the binder. It is, however, also possible to disperse the fine particulate solid, in a solution of the polymer P and the salts thereof, concentrating the resulting mixture by distilling off the solvents and/or water, preferably to dryness, and optionally further subjecting the resulting concentrate to thermal and/or mechanical treatment to prepare a mixture comprising pigments and modified copolymers which may then be subsequently dispersed in a liquid binder formulation. According to this process, the solid composition of fine particulate solid and polymer P and the salts thereof is easy to disperse and does not require time and energy intensive grinding to be incorporated into e.g. a paint formulation.

The invention is hereinafter also described by way of examples.

PREPARATION EXAMPLES

Abbreviations

EO ethylene oxide
PO propylene oxide
CL epsilon-caprolactone
VL delta-valerolactone
n-BA n-butyl acrylate
DBTL dibutyltin dilaurate
HEA 2-hydroxyl ethyl acrylate
IA isatoic anhydride
MPEG methoxy polyethylene glycol
bis-MPA 2,2-dimethylolpropionic acid
2-ODSA 2-octadecenylsuccinic anhydride
BTCA 1,2,4-benzenetricarboxylic anhydride
AMP 2-amino-2-methyl-1-propanol

TABLE 1

Commercially available Polymers P' used:

| Name of Polymer P' | Supplier |
| --- | --- |
| Acryflow P-120 (Acrylic polyol, OH number: 120 mg KOH/g) | LyondellBasell |
| Boltorn ® H20 (dentritic polymer based on bis-MPA, 16 terminal hydroxyl groups, molecular mass approx. 2100 g/mol) | Perstorp |
| Acryflow P-120 (Acrylic polyol, OH number: 120 mg KOH/g) | LyondellBasell |
| Oxymer ® M112, polyethylene carbonate diol, molecular mass approx. 1000 g/mol | Perstorp |
| Jeffamine ® M2070 (polyether monoamine, molecular mass approx. 2000 g/mol) | Huntmann |
| Jeffamine ® ED2003 (polyether diamines, molecular mass approx. 2000 g/mol) | Huntmann |
| Pluriol ® A350 E (Methyl polyethylene glycol, molecular mass approx. 350 g/mol) | BASF |
| Pluriol ® A500 E (Methyl polyethylene glycol, molecular mass approx. 500 g/mol) | BASF |
| Lutensol ON 110 ($C_{10}$-Oxo alcohol ethoxylate with 11 EO units) | BASF |
| Lutensol AT 11 ($C_{16-18}$-fatty alcohol ethoxylate with 11 EO units) | BASF |

The following polymers P'1 to P'6 were prepared as starting materials for polymers P.

Polymer P'1: OH-Terminated Polyetherester (MPEG350-4CL-VL-OH)

A mixture of 35 g (0.1 mol) of methyl polyethylene glycol ($M_w$ of 350 g/mol), 45.6 g (0.4 mol) of epsilon-caprolactone and 10.0 g (0.1 mol) of delta-valerolactone was treated with 0.1 g of dibutyltin dilaurate under inert gas and heated to 160° C. until a solids content of 97% had been reached. The polyetherester was obtained as a yellow/colorless liquid with an OH number of 65 mg KOH/g.

Polymer P'2: Polyester of Stearyl Alcohol and ε-Caprolactone

A mixture of 27 g (0.1 mol) of stearyl alcohol and 80.0 g (0.7 mol) of epsilon-caprolactone was treated with 0.2 g of dibutyltin dilaurate (DBTL) under inert gas and heated to 160° C. until an SC (solids content) of 97% has been reached. The product was obtained as a white solid with an OH number of 54 mg KOH/g.

Polymer P'3: Hyperbranched Polyester of Boltorn® H20, δ-Valerolactone and ε-Caprolactone A mixture of 10 g of Boltorn® H20, 50.0 g (0.44 mol) of epsilon-caprolactone and 44.0 g (0.44 mol) of delta-valerolactone was treated with 0.07 g of DBTL under inert gas and heated to 160° C. until a solid content of 97% was reached. The product was obtained as a yellow clear liquid with an OH number of 50 mg KOH/g.

Polymer P'4: Poly(nBA60-b-PolyHEA10)

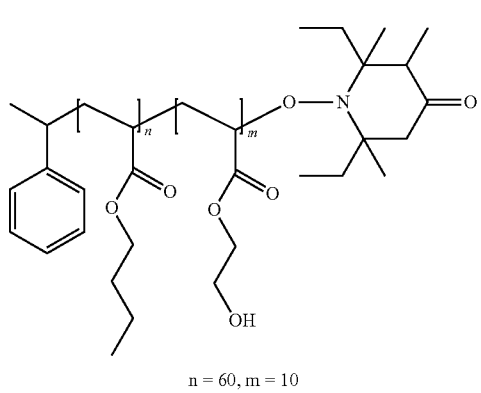

n = 60, m = 10

A mixture of 78 g (0.01 mol) of living linear polymer poly(BA) (prepared according to example 1 of US 2011/0224375) and 23.2 g (0.2 mol) of 2-hydroxyl ethyl acrylate was stirred under nitrogen at room temperature for 30 min. Then the mixture was heated at 120° C. until a SC of 88% was reached. Residual 2-hydroxyl ethyl acrylate monomer was removed under 5 mbar vacuum (at 130° C. for 2 hours). A viscous yellowish title compound Poly(nBA60-b-PolyHEA10) was obtained (SC of 98%) with an OH number of 65 mg KOH/g.

Polymer P'5: Poly(nBA30) End Functionalized with OH Group: PnBA30-OH

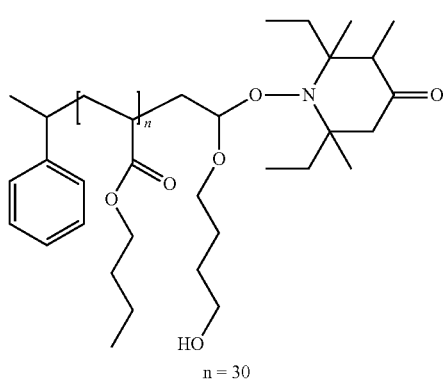

n = 30

The title compound was prepared according to example 1 of WO 2011/120947.

Polymer P'6: OH Telechelic Poly(nBA35): HO-PnBA35-OH

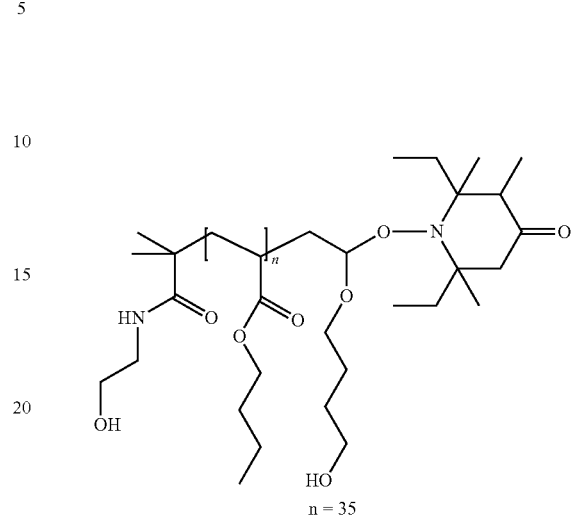

n = 35

The title compound was prepared according to example 3 of WO2011/120947.

Example 1

A mixture of 50.0 g (0.1 mol OH) of Pluriol® A500 E, 16.3 g (0.1 mol) of isatoic anhydride (IA) and 0.2 g (0.3 wt.-%) of 4-dimethylaminopyridine were heated at 80~140° C. until no more carbon dioxide was evolved. Then, 10.0 g (0.1 mol) succinic anhydride (SSA) was added and the reaction mixture was heated at 80° C. for additional 3 hours. The obtained product was a yellowish liquid with an acid number of 75 mg KOH/g.

Examples 2-19

Examples 2-19 were prepared in a similar manner as Example 1, except that the type of OH or amine functionalized polymer, the type of cyclic anhydride (CA) and the ratio of OH (amine) group to isatoic anhydride (IA) and the cyclic anhydride (CA), respectively, were varied as detailed in Table 2 below.

TABLE 2

| | OH/amine functionalized polymer | | Cyclic | Molar ratio[2] | |
| --- | --- | --- | --- | --- | --- |
| Example | | OH/NH$_2$ No.[1] (mg KOH/g) | Anhydride (CA) | OH/NH$_2$ to IA to CA | Acid No.[3] (mg KOH/g) |
| 2 | Lutensol ®AT11 | ca. 75 | SAA | 1:1:1 | 60 |
| 3 | Polymer P'1 | 65 | SAA | 1:1:1 | 51 |
| 4 | Polymer P'2 | 54 | SAA | 1:1:1 | 44 |
| 5 | Boltorn ® H20 | ca. 510 | SAA | 0.25:1:1 | 265 |

TABLE 2-continued

| Example | OH/amine functionalized polymer | OH/NH$_2$ No.[1] (mg KOH/g) | Cyclic Anhydride (CA) | Molar ratio[2] OH/NH$_2$ to IA to CA | Acid No.[3] (mg KOH/g) |
|---|---|---|---|---|---|
| 6 | Polymer P'3 | 50 | SAA | 1:1:1 | 40 |
| 7 | Polymer P'4 | 65 | SAA | 1:1:1 | 50 |
| 8 | Polymer P'5 | 17 | SAA | 1:1:1 | 10 |
| 9 | Polymer P'6 | 23 | SAA | 1:1:1 | 21 |
| 10 | Acryflow ® P-120 | 120 | SAA | 1:1:1 | 81 |
| 11 | Jeffamine ® M2070 | 30 | SAA | 1:1:1 | 24 |
| 12 | Jeffamine ® ED2003 | 50 | SAA | 1:1:1 | 43 |
| 13 | Oxymer ® M112 | 110 | SAA | 1:1:1 | 76 |
| 14 | Plurio ® A350E | 160 | Glutaric anhydride | 1:1:1 | 94 |
| 15 | Lutensol ®ON110 | 90 | Maleic anhydride | 1:1:1 | 65 |
| 16 | Polymer P'1 | 65 | 2-ODSA[4] | 1:1:1 | 38 |
| 17 | Polymer P'2 | 54 | Phthalic anhydride | 1:1:1 | 41 |
| 18 | Lutensol ®AT11 | 75 | BTCA[5] | 1:1:1[6] | 98 |
| 19 | Pluriol ® A500E | 110 | Pyromellitic dianhydride | 1:1:0.5 | 74 |

[1]OH— or amine number of the polymer P'
[2]molar ratio of OH or amine groups to compounds II or III
[3]acid number of the resulting polymer P
[4]2-ODSA: 2-octadecenylsuccinic anhydride
[5]BTCA: 1,2,4-benzenetricarboxylic anhydride
[6]stirred at 130° C. after anhydride addition Performance Testing In order to test the dispersion effect of the obtained samples, Resin Free Pigment Concentrates (mill-base) were prepared according to the following Formulations F1, F2 and NF2. The mill-base was dispersed in Scandex Shaker for 1 h with the help of glass beads. Afterwards the mill base was filtered and stored at room temperature overnight.

Preparation of Mill-base Formulations F1 and F2, the 2-amino-2-methyl-1-propanol (AMP) neutralized Mill-base Formulation NF2 and the comparative Mill-base Examples C1 and C2:

| | Ingredients | Mill-base No. | | | | |
|---|---|---|---|---|---|---|
| | | F1 | C1 | F2 | NF2 | C2 |
| 1) | Polymer P (100% solid) [g] | 0.8 | — | 0.3 | 0.3 | — |
| 2) | Palatinol P 10 [g] | 12.7 | 13.5 | — | — | — |
| 3) | Water [g] | — | — | 9.7 | 9.63 | 10.0 |
| 4) | AMP, 70% active [g] | — | — | — | 0.07 | — |
| 5) | Pigment Kronos 2310 [g] | 26.5 | 26.5 | 30.0 | 30.0 | 30.0 |
| 6) | 2.0 mm glass beads [g] | 40.0 | 40.0 | 40.0 | 40.0 | 40.0 |
| | Total (g) | 80.0 | 80.0 | 80.0 | 80.0 | 80.0 |

Palatinol P 10 (plasticizer di-2-propylheptylphthalat, BASF)
Pigment Kronos 2310 (Kronos Inc.)

In addition, competitive dispersants were synthesized according to EP0417490A. The performance of these dispersants was tested according to Formulations 1 and 2. Results showed that example 17 (tripropylenglycolmonom-ethylether-ε-caprolactone-phosporic aicd), performs better than the others, which was then taken as a comparison dispersant C3.

The performance of the polymers P of examples 1 to 19 was tested by determining the rheological behaviour of the Millbase Formulations F1, F2, and NF2, including the specified amount of polymer P. The rheological behavior of the millbases was measured at 23° C. with a Thermo-Haake RheoStress 600 rheometer under CR-mode with rotation speed of 60 sec$^{-1}$, respectively, using a cone-plate sensor.

The millbases containing the polymers P flowed well and their viscosities were comparable or lower than the product of the comparative example. Results are summarized in table 3:

TABLE 3

The dispersion effect in clear coat paint system (millbases containing the polymers P)

| | Viscosity of millbases F1, F2 and NF2 (mPas)[2] | | |
|---|---|---|---|
| Example | F1 | F2 | NF2 |
| C1 | 2450 | — | — |
| C2 | — | 6350 | — |
| C3[1] | 5800 | 4250 | 1650 |
| 1 | — | 450 | 3300 |
| 2 | 530 | >10000 | 450 |
| 3 | 7800 | >10000 | 450 |
| 4 | 2700 | — | — |
| 7 | 2500 | — | — |
| 8 | 3750 | — | — |
| 11 | — | 1050 | 850 |
| 18 | 750 | >10000 | 450 |
| 19 | — | 850 | 500 |

[1]Comparative Example C3: example 17 of EP0417490A
[2]measured at constant rotation speed of 90 sec$^{-1}$ The performance of Polymers P was also tested in clear coating systems with respect to gloss and anti-cratering effect. First, let-down formulations (formulations F3 and F4) based on a clear coating system were prepared.

Formulation F3. Organic solvent based clear-coating system

| Ingredient | % b.w. in Formulation |
|---|---|
| Resin 1 | 24.7% |
| Resin 2 | 23.1% |
| Resin 3 | 11.5% |

33
-continued

| Formulation F3. Organic solvent based clear-coating system | |
|---|---|
| Ingredient | % b.w. in Formulation |
| Plasticizer | 2.9% |
| Butyl Acetate | 18.9% |
| Xylene | 18.9% |
| Total | 100% |

Resin 1: Saturated polyester resin in Solvent naphtha/Methoxy propanol/Xylene (Setal 173 VS-60) from Nuplex;
Resin 2: Mixture of 64.8 g of a first cellulose acetate butyrate (CAB 381.2) and 25.2 g of a second cellulose acetate butyrate (CAB 381.20) in 255 g butyl acetate and 255 g of xylene, commercially available from Eastman Chemical;
Resin 3: Maprenal MF 650: highly reactive isobutylated melamine-formaldehyde resin, commercially available from Ineos;
Plasticizer: Resamine HF 480: Polyurea plasticizer, Carbamic resin based on butylurethane and formaldehyde, commercially available from Cytec.

| Formulations F4. Water based clear-coating system | |
|---|---|
| Ingredient | % b.w. in Formulation |
| Resin 4 | 99.9% |
| Levelling agent | 0.1% |
| Total | 100% |

Resin 4: NeoCryl™ XK-90: 100% acrylic emulsion polymer from DSM;
Levelling agent: EFKA-3570: Levelling and anti-cratering agent for aqueous coatings, neutralized fluorocarbon-modified polyacrylate, commercialy available from BASF.

Then, the following paint compositions were prepared by mixing 1.0 g of the respective millbases F1, F2 and NF2 with 9.0 g of the clear coating systems F3 and F4, respectively, for 5 minutes at 2000 rpm:

| Paint compositions | Mill-base formulations | | | Clear coating systems | |
|---|---|---|---|---|---|
| | F1 | F2 | NF2 | F3 | F4 |
| P1 | 1.0 g | — | — | 9.0 g | — |
| P2 | — | 1.0 g | — | — | 9.0 g |
| P3 | — | — | 1.0 g | — | 9.0 g |

The paint was applied on polyester film with a 150 μm film thickness.

The gloss of the obtained coatings at 20° angle was determined according to DIN 67530 using a commercial reflectometer (Micro-Tri-Gloss reflectometer from BYK Gardner). The performance was generally very good with satisfactory results, e.g. high gloss in let-down tests. The results are summarized in table 5.

TABLE 5

| Gloss (20°) and crater ranking of paint compositions P1, P2 and P3 | | | |
|---|---|---|---|
| Based on | Gloss (20°)/crater ranking[1] | | |
| Example | P1[2] | P2[2] | P3[2] |
| C1 | 70.2/3 | — | — |
| C2 | — | 62.1/3 | — |
| C3[3] | 72.6/2 | 67.2/2 | 68.2/2 |
| 1 | — | 70.2/1 | 69.1/1 |
| 2 | 74.8/1 | 60.1/2 | 71.5/1 |
| 3 | 73.6/2 | 65.1/2 | 70.2/1 |
| 4 | 74.5/1 | — | — |
| 7 | 75.0/1 | — | — |
| 8 | 74.3/2 | — | — |

TABLE 5-continued

| Gloss (20°) and crater ranking of paint compositions P1, P2 and P3 | | | |
|---|---|---|---|
| Based on | Gloss (20°)/crater ranking[1] | | |
| Example | P1[2] | P2[2] | P3[2] |
| 11 | — | 71.3/1 | 68.5/1 |
| 18 | 75.1/1 | 63.5/3 | 69.4/1 |
| 19 | — | 69.7/1 | 70.1/1 |

[1]1 means no crater and 5 means many craters
[2]let down films
[3]Comparative Example C3: example 17 of EP0417490A

We claim:

1. A polymer P comprising at least one functional group of the formula (I):

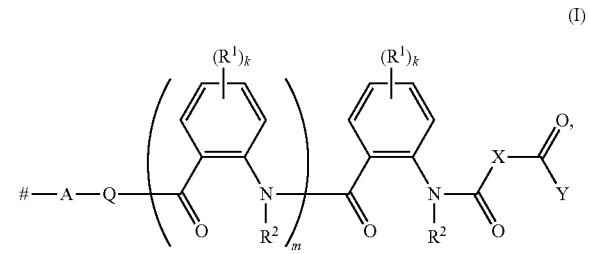

bound to one of the termini and/or to the backbone of the polymer, or a salt thereof,
wherein:
# indicates the point of attachment to the terminus and/or to the polymer backbone;
k is 0, 1, 2, 3 or 4;
m is 0, 1, 2, 3, 4, 5, 6, 7, 8 or 9;
A is a chemical bond or a divalent moiety selected from the group consisting of $C_1$-$C_6$ alkylene, —O—($C_2$-$C_6$ alkylene), —C(=O)—O—($C_2$-$C_6$ alkylene), —NR$^3$—($C_2$-$C_6$ alkylene) and C(=O)—NR$^3$—($C_2$-$C_6$ alkylene), where the $C_2$-$C_6$ alkylene part is attached to Q;
Q is a divalent moiety selected from the group consisting of —O—, —NH— and —S—;
R$^1$ is independently selected from the group consisting of —OH, —COOH, —COOCH$_3$, —NH($C_1$-$C_6$ alkyl), —N($C_1$-$C_6$ alkyl)$_2$, —NO$_2$, —S(=O)$_2$R$^4$, $C_1$-$C_{20}$ alkyl, $C_1$-$C_4$ alkoxy, halogen, aryloxy, aryl, heteroaryl, where aryl, hetaryl and aryloxy are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;
R$^2$ is selected from the group consisting of hydrogen, —S(=O)$_2$R$^4$, $C_1$-$C_{20}$ alkyl, $C_3$-$C_{10}$ cycloalkyl, aryl, heteroaryl, aryl-$C_1$-$C_4$-alkyl and heteroaryl-$C_1$-$C_4$-alkyl, where aryl and hetaryl in the four last mentioned radicals are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;
X is a divalent moiety selected from the group consisting of linear $C_1$-$C_{10}$ alkylene, linear $C_2$-$C_6$ alkenylene, $C_4$-$C_7$ cycloalkylene, arylene and alkarylene, where the linear $C_1$-$C_{10}$ alkylene, linear $C_2$-$C_6$ alkenylene and $C_4$-$C_7$ cycloalkylene are unsubstituted or substituted by 1, 2, 3 or 4 radicals selected from the group consisting of $C_1$-$C_{18}$ alkyl or $C_1$-$C_{18}$ alkenyl, and where arylene and alkarylene are unsubstituted or substituted by 1, 2, 3 or 4 radicals selected from the group consisting of $C_1$-$C_4$ alkyl, $C_1$-$C_4$ haloalkyl, aryl, —COOH, —COOCH$_3$, —NO$_2$ or halogen;

$R^3$ is selected from the group consisting of hydrogen, —S(=O)$_2$R$^4$, $C_1$-$C_{20}$ alkyl, $C_3$-$C_{10}$ cycloalkyl, aryl and heteroaryl, where aryl and hetaryl are unsubstituted or substituted by 1, 2, 3 or 4 radicals selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy and halogen;

$R^4$ is selected from the group consisting of OH, —NH$_2$, —NH($C_1$-$C_6$ alkyl), —N($C_1$-$C_6$ alkyl)$_2$, $C_1$-$C_4$ alkyl, $C_1$-$C_4$ alkoxy, aryl and heteroaryl, where aryl and hetaryl are unsubstituted or substituted by 1, 2, 3 or 4 radicals selected from the group consisting of $C_1$-$C_4$ alkyl, $C_1$-$C_4$ alkoxy and halogen;

Y is selected from —OH or a moiety of the general formula (I.2):

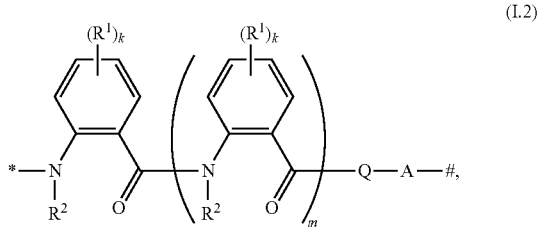

where * indicates the point of attachment to the carbonyl group and #, k, m, A, Q, R$^1$ and R$^2$ are as defined above; and the polymer P is selected from the group consisting of a polyester, a polyether, a polyetherester, a polycarbonate and a polymer having a C—C-backbone, in which the polymer having a C—C-backbone comprises repeating units M1 selected from the group consisting of a polymerized $C_1$-$C_{10}$-alkyl (meth)acrylate, a polymerized $C_1$-$C_{10}$-alkyl-(poly-$C_2$-$C_4$-alkyleneglycol) (meth)acrylate and a polymerized vinylaromatic hydrocarbon compound.

2. The polymer P of claim 1, wherein:
k is 0 or 1;
m is 0 or 1;
A is a chemical bond or a divalent moiety selected from the group consisting of —C(=O)—O—($C_2$-$C_4$ alkylene) and C(=O)—NH—($C_2$-$C_4$ alkylene), where the alkylene part is attached to Q;
Q is a divalent moiety selected from the group consisting of —O— and —NH—;
R$^1$ is independently selected from the group consisting of —OH, —COOH, —COOCH$_3$, —NH$_2$, —NH($C_1$-$C_6$ alkyl), —N($C_1$-$C_6$ alkyl)$_2$, —NO$_2$, —S(=O)$_2$R$^4$, $C_1$-$C_4$ alkyl, $C_1$-$C_4$ alkoxy, halogen, phenyl and pyridyl;
R$^2$ is selected from the group consisting of hydrogen, $C_1$-$C_4$ alkyl and phenyl;
X is selected from the group consisting of linear $C_2$-$C_6$ alkylene, $C_2$-alkenylene and 1,2-phenylene, where $C_2$-$C_6$ alkylene and $C_2$-alkenylene are unsubstituted or carry a $C_1$-$C_{18}$ alkyl or $C_1$-$C_{18}$ alkenyl radical and 1,2-phenylene is unsubstituted or substituted by 1 or 2 radicals selected from the group consisting of $C_1$-$C_3$ alkyl, —COOH or halogen;

R$^4$ is selected from the group consisting of —NH$_2$, —NH($C_1$-$C_6$ alkyl), —N($C_1$-$C_6$ alkyl)$_2$ and $C_1$-$C_4$ alkyl; and Y is selected from —OH.

3. The polymer P of claim 2, wherein:
k and m are both 0;
R$^2$ is hydrogen; and
X is $C_2$-$C_4$ alkylene.

4. The polymer P of claim 1, which is a poly-($C_2$-$C_4$-alkylene oxide).

5. The polymer P of claim 1, which is an aliphatic polyester.

6. The polymer P of claim 1, which is an aliphatic polyether-ester.

7. The polymer P of claim 1, which is an aliphatic polycarbonate.

8. The polymer P of claim 1, which has a C—C-backbone comprising repeating units M1 selected from a polymerized $C_1$-$C_{10}$-alkyl (meth)acrylate, a polymerized $C_1$-$C_{10}$-alkyl-(poly-$C_2$-$C_4$-alkyleneglycol) (meth)acrylate and a polymerized vinylaromatic hydrocarbon compound, wherein the repeating units M1 make up from 10 to 90% by weight of the polymer P.

9. The polymer P of claim 1, which has a number average weight in the range from 500 to 100,000 Dalton.

10. The polymer P of claim 1, which has an acid number in the range of from 3 to 500 mg KOH/g.

11. A process for manufacturing the polymer P of claim 1, the process comprising reacting
a polymer P.1 comprising at least one radical of formula (I.1):

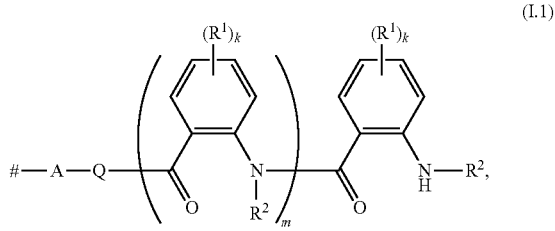

bound to one of the termini and/or backbone of the polymer; and reacting the polymer P.1 with an acid anhydride of formula (IV):

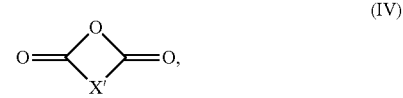

wherein X' is a divalent moiety selected from the group consisting of linear $C_1$-$C_{10}$ alkylene, linear $C_2$-$C_6$ alkenylene, $C_4$-$C_7$ cycloalkylene, arylene and alkarylene, where the linear $C_1$-$C_{10}$ alkylene, linear $C_2$-$C_6$ alkenylene and $C_4$-$C_7$ cycloalkylene are unsubstituted or substituted by 1, 2, 3 or 4 radicals selected from the group consisting of $C_1$-$C_{18}$ alkyl or $C_1$-$C_{18}$ alkenyl, and where arylene and alkarylene are unsubstituted or substituted by 1, 2, 3 or 4 radicals selected from the group consisting of $C_1$-$C_4$ alkyl, $C_1$-$C_4$ haloalkyl, aryl, —COOH, —COOCH$_3$, —NO$_2$ or halogen, such that if X' carries 2, 3 or 4 COOH groups, two COOH groups optionally form an anhydride group.

12. The process of claim 11, comprising reacting a polymer P' comprising at least one functional moiety of the formula A-Q-H attached to one of the termini and/or to the backbone of the polymer P' with a compound of the formulae (II), (II') or (III):

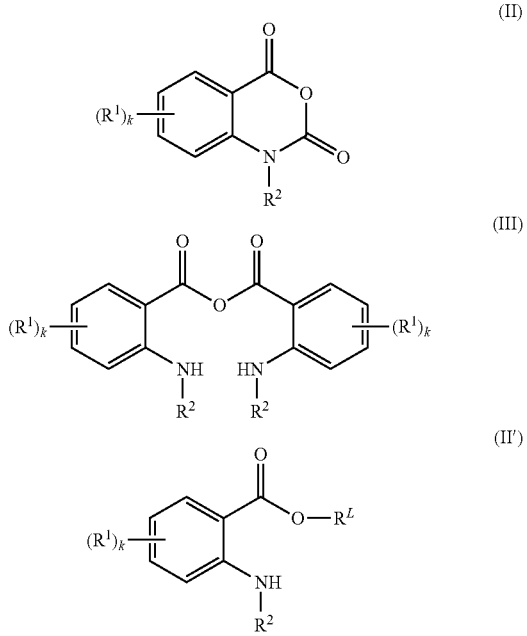

wherein:
$R^L$ is hydrogen or a hydrocarbon radical having 1 to 8 carbon atoms; and
the polymer P' does not have a functional group of the formula (I.1).

13. A liquid composition in the form of a dispersion comprising:
a fine particulate solid material selected from the group consisting of a pigment and a filler; and
a liquid diluent; and
the polymer P of claim 1 or salt thereof, wherein the fine particulate solid material is dispersed in the liquid diluent.

14. The liquid composition of claim 13, wherein a weight ratio of fine particulate solid material to the polymer P is in the range from 100:1 to 1:50.

15. The liquid composition of claim 13, comprising
i) 1 to 70% by weight, based on the total weight of the liquid composition, of at least one of the fine particulate solid material;
ii) 0.5 to 50% by weight, based on the total weight of the liquid composition, of at least one of the polymer P optionally in the form of a salt; and
iii) 10 to 98.5% by weight, based on the total weight of the liquid composition, of at least one of the liquid diluent.

16. The liquid composition of claim 13, which is in the form of a millbase.

17. The liquid composition of claim 13, which is in the form of a coating composition.

18. The liquid composition of claim 13, which is in the form of an ink.

19. A dispersant comprising the polymer P of claim 1 or salt thereof, said dispersant adapted to function as a dispersant for fine particulate solid material selected from the group consisting of a pigment and a filler.

20. The dispersant of claim 19, which is in a liquid composition selected from the group consisting of a coating composition, a millbase and an ink.

21. A composition comprising the polymer P of claim 1 or salt thereof, said composition selected from the group consisting of a crosslinking agent, a rheology modifier, an impact modifier, a chain extender, and a building block for preparation of block- or graft-copolymers.

22. The polymer P of claim 1, wherein the polymer P is selected from the group consisting of a polyester, a polyether, a polyetherester, a polycarbonate and a polymerized vinylaromatic hydrocarbon compound.

23. The polymer P of claim 1, wherein the at least one functional group is bound to one of the termini of the polymer.

24. The polymer P of claim 1, wherein the at least one functional group is bound to the backbone of the polymer.

* * * * *